United States Patent [19]
Craze et al.

[11] Patent Number: 5,809,564
[45] Date of Patent: Sep. 15, 1998

[54] APPARATUS AND METHOD FOR SWAPPING BLOCKS OF MEMORY BETWEEN A MAIN MEMORY AREA AND A SECONDARY STORAGE AREA OF A COMPUTER SYSTEM

[75] Inventors: Andrew C. Craze, Redmond; Robert I. Davidson; Paul W. Davis, both of Bellevue, all of Wash.

[73] Assignee: Microsoft Corporation, Redmond, Wash.

[21] Appl. No.: 266,731

[22] Filed: Jun. 27, 1994

[51] Int. Cl.⁶ ...................................................... G06F 12/10
[52] U.S. Cl. .............................................................. 711/208
[58] Field of Search ...................................... 395/427, 700, 395/650, 401, 402, 418; 711/208

[56] References Cited

U.S. PATENT DOCUMENTS

| | | | |
|---|---|---|---|
| 5,063,499 | 11/1991 | Garber | 395/500 |
| 5,189,733 | 2/1993 | Bennett et al. | 395/497.01 |
| 5,375,241 | 12/1994 | Walsh | 395/685 |
| 5,535,394 | 7/1996 | Burke et al. | 395/709 |
| 5,539,899 | 7/1996 | Huynh et al. | 395/497.02 |
| 5,579,520 | 11/1996 | Bennett et al. | 395/704 |

OTHER PUBLICATIONS

Rose, Caroline et al., *Inside Macintosh*™ vol. I, Addison–Wesley Publishing Company, Inc., Reading, MA, 1985, Chapter 5, "The Resource Manager," pp. I–103 through I–134.

Rose, Caroline et al., *Inside Macintosh*™ vol. II, Addison–Wesley Publishing Company, Inc., Reading, MA, 1985, Chapters 1 and 2, "The Memory Manager" and the Segment Loader, pp. II–9 through II–64.

*Primary Examiner*—Kevin A. Kriess
*Assistant Examiner*—St. John Courtenay, III
*Attorney, Agent, or Firm*—Westman, Champlin & Kelly, P.A.

[57] ABSTRACT

A method and system for swapping blocks of data between a main memory area and a secondary storage area of a computer system that uses absolute addresses as its native addressing format. A series of linked information structures is maintained in the main memory area of the computer system. Each information structure allocates storage for a near return address pointer, a previous information structure pointer, a reference number and an offset. A first and second data block are swapped into the main memory area of the computer system. When the first data block transfers control to the second data block, a memory location indicating an absolute address for this point of transfer is stored in an information structure associated with the first data block. Prior to swapping the first data block out of the main memory area, the absolute address is resolved into a reference number and an offset. This resolved address is then stored in an information structure associated with the first data block. When the first data block is swapped back into the main memory area, the resolved address is restored into a new absolute address which directs processing control to a proper return point in the first data block.

17 Claims, 18 Drawing Sheets

APPARATUS AND METHOD FOR SWAPPING BLOCKS OF MEMORY BETWEEN A MAIN MEMORY AREA AND A SECONDARY STORAGE AREA OF A COMPUTER SYSTEM

TECHNICAL FIELD

The present invention relates to the field of swapping blocks of memory between a main memory and secondary storage of a computer memory system, and, more particularly, to an apparatus and method for swapping blocks of memory that are part of a call chain.

BACKGROUND OF THE INVENTION

Application programs have only a finite amount of main memory in which to run. A typical application program is larger than this finite amount of memory. Therefore, to avoid overflow, only portions of the application program are loaded into memory at any one time. Typically, portions of the application program (e.g., blocks of data) are swapped between a secondary storage (e.g, a disk) and main memory, as needed. The term swapping refers to the processes of unloading a block of data out of main memory to secondary storage and replacing the unloaded block of data with another block of data from secondary storage into main memory. This data may include coded instructions. It is not uncommon for a portion of the application program to be swapped in and out of memory several times during a single execution of an application program. Moreover, the portion of the application program is likely to be placed at a different memory location in main memory each time that the portion is reloaded.

Such swapping has a number of complications. For example, certain portions of the application, regardless of size, simply cannot be swapped out. Typically, these portions of the application cannot be swapped out because other portions of the application rely on locating these portions at a specific memory location in main memory. However, if one of these relied upon portions is swapped out, the specific memory location will no longer contain the relied upon portion. As a result, the application program malfunctions because it cannot locate the relied upon portion of the application program. The following example illustrates the problem as it exists when executing segmented software in a computer system that utilizes a flat address space.

Segmented software is simply software (e.g., an application program) that has been divided into two or more portions. As will be explained below, each of these portions or segments, has one or more code entry points. Each of these code entry points is represented by a pair of values: a segment number and an offset. A segment number and offset pair is conventionally referred to as a segmented address. However, a flat address space references each physical location of main memory with a single number. This single number is conventionally known as an absolute address. Thus, in order to access the code entry points of segmented software in a flat address space, the code entry points must be translated from their segmented address formats into their respective absolute address formats. In a flat address space, the absolute address format is known as the native -address format. The term "native" is used to indicate the address format that the central processing unit utilizes in order to access the physical memory locations of main memory. Analogously, the segmented address format, is, for computer systems having a flat address space, a non-native address format. As will be explained below, segmented addresses are translated into absolute addresses by loading a segment into a known location of main memory and adding the offset to this known location. Additionally, because a loaded segment occupies a contiguous portion of main memory, each instruction of a loaded segment is identified by a unique absolute address. As will be explained below, the application program periodically relies on locating an instruction at a particular absolute address. However, this particular absolute address is dependent upon the location of main memory where the segment containing the instruction is loaded. As previously explained, when a segment is swapped out and later swapped back in, the segment is likely to be placed at a memory location which differs from the memory location where the segment was originally loaded. As a result, if a segment containing one of these relied upon instructions is swapped out, the relied upon instruction will no longer be located at the particular absolute address. Consequently, the application program malfunctions because it cannot locate the relied upon instruction. This problem will now be explained as it exists in the Macintosh computer system sold by Apple Computer, Inc. More specifically, the discussion which follows relates to the Macintosh 68000 computer system. This system uses Motorola's 68000 microprocessor as a central processing unit. As the 68000 microprocessor uses a flat address space, its native address format is the above-described absolute address format.

FIG. 1 illustrates a computer system, such as the Macintosh 68000, that utilizes a flat address space. The computer system includes a permanent storage area 105 holding an application 190. This application program is shown divided into four segments: 100, 110, 120, and 130 of FIG. 1. Application programmers write software for these segments in programming languages (e.g., C, Pascal, Assembly) that the computer system cannot immediately understand. The resulting code is commonly referred to as source code. The programmer uses a compiler to translate the source code into a format that the computer system can understand. The format that a computer system can understand is called object code. In object code, data is represented by a series of bits. The word bit is shorthand for binary digit and describes the smallest unit of information that a computer system processes. As its name implies, a bit may exist in one of two states, i.e., 0 or 1. Standing alone, a single bit can only convey information regarding its own state. However, a group of eight bits, known as a byte, can convey a variety of information (e.g., the letters of the alphabet). Generally, the compiler translates, or compiles, the source code into object code by assigning one or more of these groupings to every instruction, label, variable, etc., in the source code.

A segment may contain references to locations in another segment (e.g., a call to a routine of another segment). The compiler often cannot assign bit groupings for these references because their actual locations are unknown to the compiler. However, the programmer can still compile these segments by declaring each of these references as an EXTERNAL. These EXTERNAL declarations alert the compiler that the locations of the references will be resolved at a later time. Additionally, the programmer must declare the actual locations of the references as GLOBALS. These GLOBAL declarations allow other segments to access the locations (e.g., to call a GLOBALLY declared routine). By making such EXTERNAL and GLOBAL declarations, the programmer enables a linker program to resolve all external references of a segment.

A linker program merges all the compiled segments into a single executable program; that is, a program that will run on the computer system. The linker can resolve all external references because it has access to compiled versions of each segment. In the case of the Macintosh, a linker resolves external references by creating a jump table entry for each globally declared code entry point.

These entries of the jump table can exist in two states (as shown in FIG. 1): indicating that the segment containing the globally declared code entry point is unloaded, 151, or loaded, 152. Regardless of which state a particular jump table entry is in, the entry contains a segment number (153 and 154) which identifies the segment containing the globally declared function. In addition to this segment number 154, the loaded jump table 152 entry contains a jump instruction 155 which directs processing to an entry point of the globally declared function. Similarly, the unloaded jump table entry 151 contains a load segment trap call 156 and an offset 157 which directs processing to the entry point of the globally declared function. The use of the load segment trap call 156 and the offset 157 will be explained below.

Collectively, the loaded and unloaded jump table entries are stored in the jump table 180. By using this jump table 180, load segment trap 150, and unload segment trap 160, the Macintosh operating system 140 swaps segments between secondary storage 105 and main memory 170. When the operating system 140 loads a segment, it translates all jump table entries for the segment to the loaded state 152. Conversely, when the operating system 140 unloads a segment, it translates all jump table entries of a segment to the unloaded state 151. In this manner, the Macintosh operating system 140 recognizes which segments it has loaded into the portion of main memory 170 reserved for the use of an application.

The portion of main memory reserved for the use of an application is known as the application space 172. When loading an application, the operating system 140 stores the jump table 180, a series of application parameters 183 and globals 184 into a portion of the application space known as the A5 World. The operating system defines the A5 World by loading a Register A5 with the address which points to the global variables of the application. This address, conventionally known as the A5 address 188, is fixed throughout the life of the application. The application conducts the majority of its addressing relative to this address.

The remainder of the application space 172 is shared between a stack 186 and an application heap 175. Both the stack 186 and the heap 175 are used to store data for the application program. A stack is a data structure organized as a last-in, first-out (LIFO) list. As such, memory on the stack 186 is always allocated by appending the data to the end of the stack. In contrast, memory on a heap 175 is allocated in blocks from any location in the heap —wherever a sufficiently sized block of free memory 185 exists. The amount of Free Memory 185 is defined by the amount of remaining unused memory of the stack 186 and the heap 175. As data is added to the stack 186 and application heap 175, the amount of Free Memory 185 available to the application program is necessarily reduced. However, at no point may the stack 186 and the application heap 175 collide. Such a collision, commonly referred to as stack overflow, is catastrophic (e.g., resulting in data destruction or system failure).

In order to minimize the possibility of stack overflow, memory allocation on the stack 186 adheres to a strict last-in, first-out (LIFO) data management scheme. The LIFO management scheme ensures that the stack 186 grows only as large as is required by the application 190. More specifically, under the LIFO data management scheme, the last item of data added to the stack is the first item of data removed from the stack 186. For example, the Macintosh system functionally adds and removes items on the stack by updating a stack pointer. When a function calls another function, the Central Processing Unit (CPU) of the Macintosh system stores, or pushes the return address of the calling function into the next available memory location on the stack. This return address identifies the location in the application heap where the CPU should continue processing when the called function returns to the calling function. As previously explained, the Macintosh 68000 system utilizes a flat address space. As a result, this return address is stored as an absolute address. The CPU pushes the return address by decrementing the contents of the stack pointer and storing the return address in a memory location pointed to by the decremented stack pointer. Additionally, the CPU pushes the local variables of the called function beneath the pushed return address. Upon returning to the calling function, the CPU removes, or pops, the local variables off the stack before popping the return address off the stack 186. In contrast to pushing, the CPU pops data off the stack by incrementing the stack 186 pointer. In this manner, the LIFO management scheme ensures that the data stored on the stack does not become fragmented.

In contrast to the stack 186, the application heap 175 does not adhere to a LIFO management scheme; as a result, the data stored on the application heap 175 can become fragmented. More specifically, the application heap 175 may consist of one or more blocks of Free Memory 185 depending on the order that the operating system 140 unloads blocks of data (including segments) relative to the order that the operating system 140 loaded the data. FIG. 2 shows two such blocks of fragmented Free Memory 185.

The operating system 140 swaps segments into the application heap 175 using a load segment trap 150. The operating system 140 provides the load segment trap 150 so that application programs can swap unloaded segments into the application heap 175 as the segments are needed. The application can accomplish this swapping in one of two ways. First, the application can call the load segment trap 150 directly. In this case, the load segment trap operates as a normal subroutine, loading a named segment for the application and returning. Second, the application can call the load segment trap 150 indirectly. In this case, the load segment trap operates transparently to the application program; that is, the trap loads a segment without the application program explicitly requesting a load. Most commonly, a transparent invocation of the load segment trap 150 occurs when a function calls a function contained in an unloaded segment.

The operating system of the Macintosh handles a call to a function in an unloaded segment as follows. When the function of the loaded segment calls the function of the unloaded segment, the jump table entry for the unloaded function is in an unloaded state 151. Consequently, the jump table entry 151 triggers a load segment trap call 156 using the segment number 153 from the jump table entry 151. Subsequently, the load segment trap call 156 loads the segment number 153 into a known address of Free Memory 185. Having loaded the segment, the load segment trap 150 translates all jump table entries for the newly loaded segment into the loaded state 152. After translating these jump table entries, the load segment trap indexes into the newly loaded segment by an amount indicated by the offset 157 of the jump table entry 151. By indexing in this manner, the operating system 140 directs processing control to the proper location in the newly loaded segment. Thus, the Macintosh system is able to load a segment in a manner transparent to the application program.

In contrast to the load segment trap 150, the unload segment trap 160 of the Macintosh operating system cannot operate transparently to the application program. Instead, the application program has to explicitly direct the operating system 140 to swap-out, or purge, a segment. However, application programs are ill-suited for directing the operating system in this regard because the application program cannot quickly discern the most suitable segment to swap-out. Thus, in conventional systems application programs frequently swap-out non-optimal segments (e.g., relatively small segments or a frequently called segments). Moreover, allocating purging responsibilities to the application program adds system-specific code to the software of the application program. As a result, the application program is not easily transportable between operating systems.

Another problem of running segmented software on a computer system which utilizes a flat address space is that neither the operating system nor the application program can swap-out a segment having pending returns. A segment has a pending return if (1) a function contained within the segment has called another function and (2) the called function has not yet returned to the calling function. Pending returns occur frequently because modular programming practices produce programs wherein code is modularized such that functions of one segment frequently call functions of another segment. When a function calls another function, both the calling function and the called function are said to be part of a call chain. In these call chains, the CPU uses stored pending return addresses to return processing control to the calling function after the execution of the called function is complete. However, conventional systems which run segmented software in a flat address space cannot swap out segments which have pending returns because doing so invalidates the stored pending return addresses. Moreover, these conventional systems cannot locate the pending return addresses and therefore cannot preserve them.

As previously explained, return addresses (1) are stored as absolute addresses on the stack 186 and (2) are used to inform the CPU where to continue instruction execution when returning to a calling function (i.e., the location in the application heap that immediately follows the call instruction of the calling function). Moreover, because a segment is not loaded into a predetermined location in the application heap 175, but rather can be loaded into any sufficiently sized block of Free Memory 185, the stored return address is only valid if the segment is loaded in its original location; that is, the location where the segment was loaded when the calling function transferred control to the called function. However, since the Free Memory 185 varies significantly during the life of the application program 190, a segment that is swapped out of the application heap 175 is unlikely to be swapped back in to the application heap 175 at the same location. Therefore, if a segment of a current call chain is swapped out, the stored return address, in all probability, no longer points to the proper return instruction of the calling function. As a result, if a conventional system running segmented software in a flat address space swaps out a segment having a pending return, the application program fails.

The problem of swapping out segments of a current call chain is further complicated because identifying the stored return addresses is problematic. Primarily the identification of stored return addresses is troublesome due to inconsistent programming practices. For example, in the Macintosh Computer system, some functions develop what are referred to as stack frames using the 68000 processor's LINK <specified register>,#nn instruction. This LINK instruction saves the previous contents of the specified register on the stack and sets the specified register to point to the saved previous contents. The specified register is known as a frame pointer. If the previously held contents of the frame pointer contained the frame pointer of the calling function, the link instruction creates a chain of frame pointers. Moreover, because frame pointers are created upon entry to a function, a frame pointer is located immediately below the return address of an associated calling function. As a result, the frame pointer of the called function can be used to locate the pending return address of the calling function. However, it is impossible to conclusively determine every pending return address of a call chain.

It is impossible to determine every return address for a number of reasons. First, some functions simply do not generate frames. For example, some system traps do not build frames. Second, even if each function of the call chain did generate a frame, there is no guarantee that each function used the same specified register as a frame pointer. Third, a chain of frame pointers may be broken if a function or system trap subsequently uses the specified register to store other data. Such a scenario is quite common in the Macintosh system. For example, the Macintosh Computer provides system traps which call back into code provided by the application. Such a processes known as a callback. In the Macintosh system, once such a callback has been executed, the application cannot rely on the value of any register. Thus, under these three scenarios a chain of frame pointers is either (1) never created or (2) broken by an inconsistent programming practice. As a result, conventional systems running segmented software in a flat address space cannot quickly or reliably locate pending returns. As such, these conventional systems cannot swap out segments which have pending returns.

To illustrate the usefulness of swapping segments having pending returns, a call chain is shown in FIG. 2. In FIG. 2, segments 100, 110, and 120 are shown loaded in the application heap 175 with the amount of remaining free memory represented by block 185. Additionally, functions 230, 240, 250 and 260 are all part of a current call chain (the path of the current call chain being conceptualized by arrows 222). Moreover, function 250 is shown calling an operating system trap 255 which in turn calls back into the application program. Subsequently, function 260 calls a function 270 of an unloaded segment 130.

For purposes of example, assume that the callback performed by the operating system trap 255 overwrites the data in each register. Thus, even assuming that functions 230, 240, 250, and 260 collectively created a chain of frame pointers, the operating system trap 255 broke any such chain. Additionally, assume that the amount of available Free Memory 185 is insufficient to load the unloaded segment 130. Thus, it is necessary to swap out a segment (100, 110, or 120) in order to load segment 130. However, because each of loaded segments contains a pending return address, none of these segments can be unloaded. As a result, the application program will fail.

SUMMARY OF THE INVENTION

The present invention provides a method and apparatus for swapping blocks of data between storage areas of a computer system. In its preferred embodiment, the invention is a method and apparatus for swapping application code segments between a permanent storage area (e.g., a hard drive), and a main memory area (e.g., an application heap). The preferred embodiment of the present invention generates information structures upon entry to a function. Each information structure allocates storage for: (1) a pointer to a return address, the pointer pointing to a return address into the function or a location of a restoring program; (2) a segment number field identifying the segment containing the function; (3) an offset field serving as a relative index into the segment, the index indicating a proper return point into the function; and (4) a pointer to a previous information structure, the pointer pointing an information structure of a previously called function, the previously called function being part of a current call chain.

After generating the information structures, the preferred embodiment chains the information structures together in a linked list which is stored on the stack. Furthermore, the preferred embodiment removes the information structure generated for the function upon exit of the function (e.g., immediately prior to execution of the return instruction of the function). By storing and retrieving information to and from this dynamically allocated linked-list of information structures, the preferred embodiment utilizes the memory of a computer system in a highly efficient manner.

In its preferred embodiment, the present invention provides for swapping application code segments transparently to the application program. The preferred embodiment stores a pointer to a return address in the information structure generated upon entry to a function immediately prior to the point where that function transfers control to another piece of software. Frequently, a function transfers control to a function contained in a non-loaded segments. If such a transfer occurs during low free memory conditions, the preferred embodiment swaps-out a segment of the application program before swapping in the segment containing the desired function. In its preferred embodiment, the present invention selects an appropriate segment to swap-out based on which swappable segment has been least recently called.

Having selected an appropriate segment, the preferred embodiment examines the data contained within the chain of information structures to determine functions of the selected segment having pending return addresses. For each determined function, the preferred embodiment represents the pending return address as a segment number and a relative offset. Subsequently, the preferred embodiment stores the segment number and the relative offset, in the information structure associated with the determined function. Additionally, the preferred embodiment replaces the pending return address with a pointer to a restoring code program. In this manner, the invention may swap-out segments that contain functions of the current call chain while preserving the return addresses into those functions.

When the application code executes a return instruction that references a replaced pending return address, the preferred embodiment of the present invention directs execution to the restoring code program. In turn, the restoring code program retrieves the stored segment number and the stored relative offset. Subsequently, the preferred embodiment of the present invention reloads the segment into a known address of the application heap and creates a valid return address by adding the relative offset to the known address.

Additionally, the preferred embodiment of the present invention allocates the majority of the memory management responsibilities to the operating system as opposed to the application program. In this manner, the preferred embodiment allows the application programmer to write software which is easily transportable between differing operating systems. As a corollary, this allows the application programmer to spend more time debugging and improving the application code and less time worrying about interfacing with the operating system and optimizing the use of application memory. Thus, the present invention will indirectly raise the quality of the available application programs in the marketplace. In this manner, the present invention provides an apparatus and method for swapping portions of an application program between permanent and temporary storage areas without burdening the application program.

DETAILED DESCRIPTION OF THE INVENTION

The preferred embodiment of the present invention provides a flexible and efficient apparatus and method for swapping application segments between a secondary storage and a main memory of a computer system that uses absolute addressing as its native addressing format. By permitting the programmer to selectively enable segments as swappable, the preferred embodiment affords a great flexibility to the application programmer. For each function contained within the selected swappable segments, the preferred embodiment generates an information structure. By resolving pending return addresses into segment numbers and relative offsets and storing the resolved addresses in the information structures, the preferred embodiment of the present invention can swap-out segments that are part of a current call chain. Furthermore, by restoring the resolved addresses into valid absolute addresses, the preferred embodiment of the present invention provides a swapping method and apparatus which operates transparently to the application program.

Figure 3A:
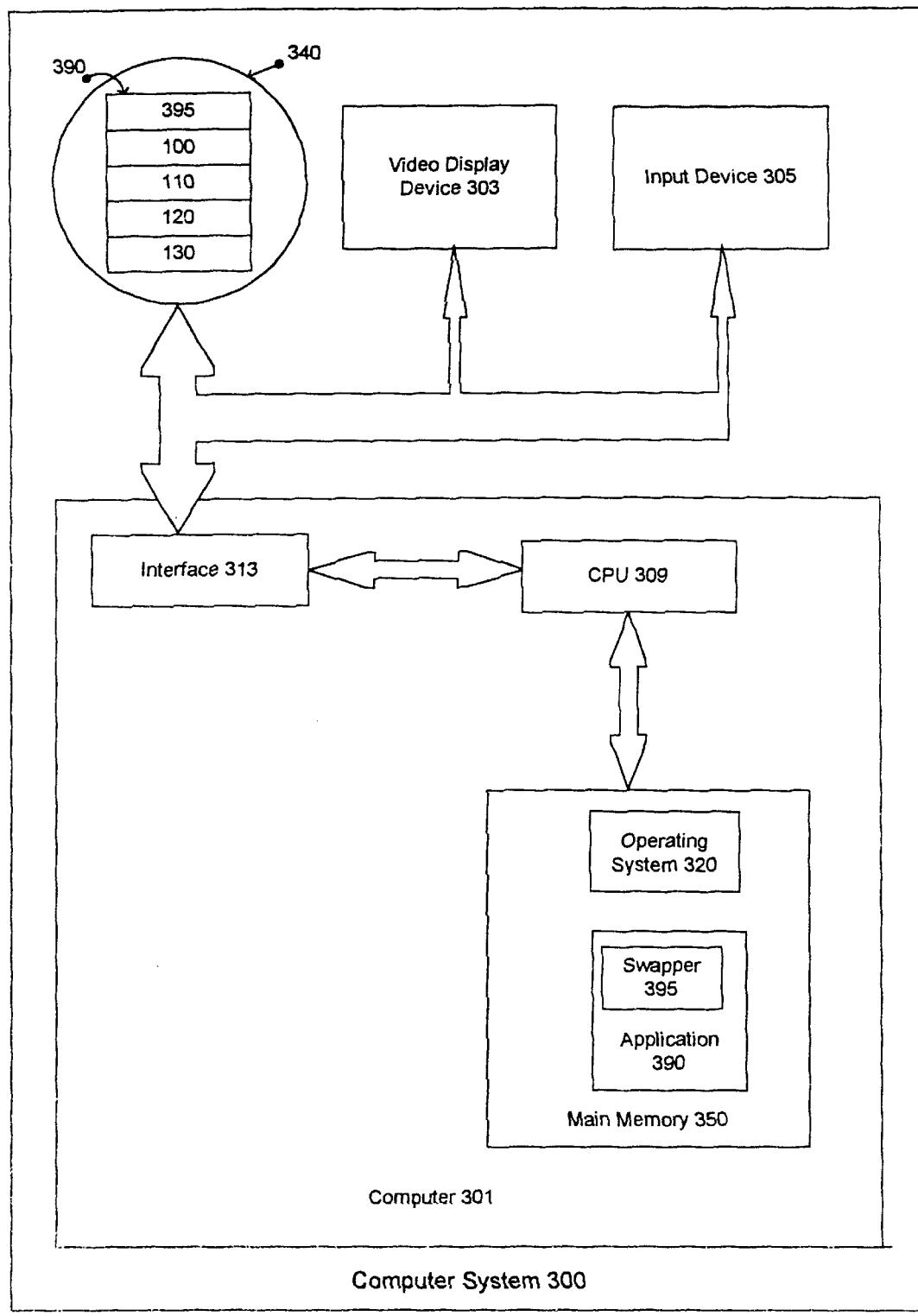
FIG. 3A is a block diagram of a computer system for practicing the preferred embodiment of the present invention.
Figure 3B:
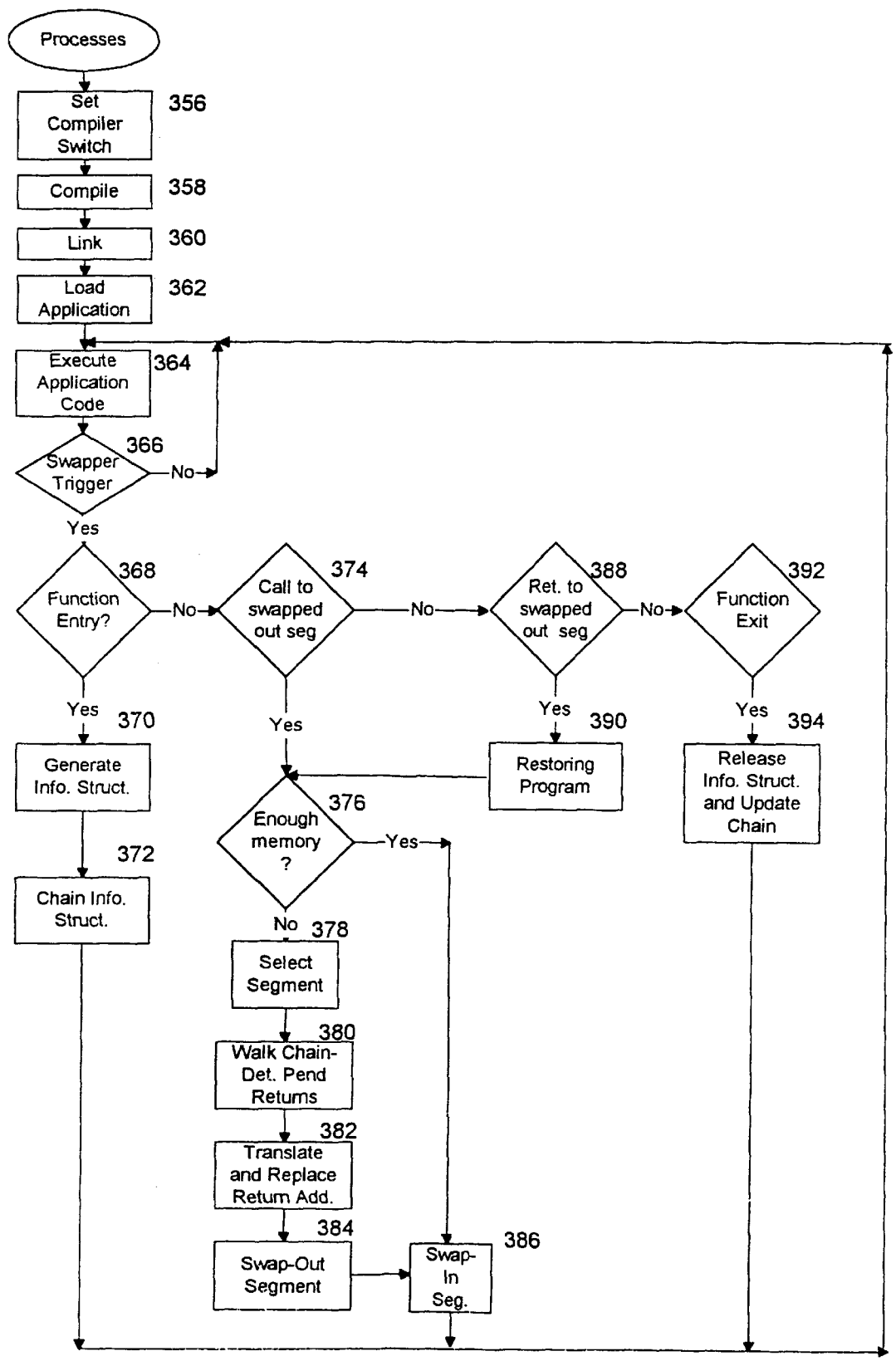
FIG. 3B is a flow diagram illustrating main processing blocks of the preferred embodiment of the present invention.

FIG. 3A is a block diagram of a computer system 300 suitable for practicing the preferred embodiment of the present invention. Those skilled in the art will appreciate that the configuration of the computer system 300 is merely illustrative and that other configurations may be used to practice the present invention. The computer system 300 includes a computer 301, a video display device 303, an input device 305, such as a keyboard, mouse, or pointing device, and a secondary storage device 340, e.g., a disk drive. The computer 301 includes a central processing unit (CPU) 309, a main memory 350, and an interface 313 for enabling communication between the CPU 309 and peripheral devices (i.e., the video display device 303, the input device 305, and the permanent storage device 340). The main memory 350 holds a copy of an operating system 320 that is run on the CPU 309. In the preferred embodiment, the Central Processing Unit is the previously-described Motorola 68000. However, those skilled in that art will realize that the present invention is not limited to computer systems using this microprocessor. In contrast, the present invention is applicable to any microprocessor that utilizes absolute addressing as its native addressing format. FIG. 3B is a flow diagram illustrating main processing blocks for practicing the preferred embodiment of the present invention. The preferred embodiment will now be described referring to FIGS. 3A and 3B. Subsequently, the preferred embodiment of the present invention will be explained in greater detail.

Figure 7:
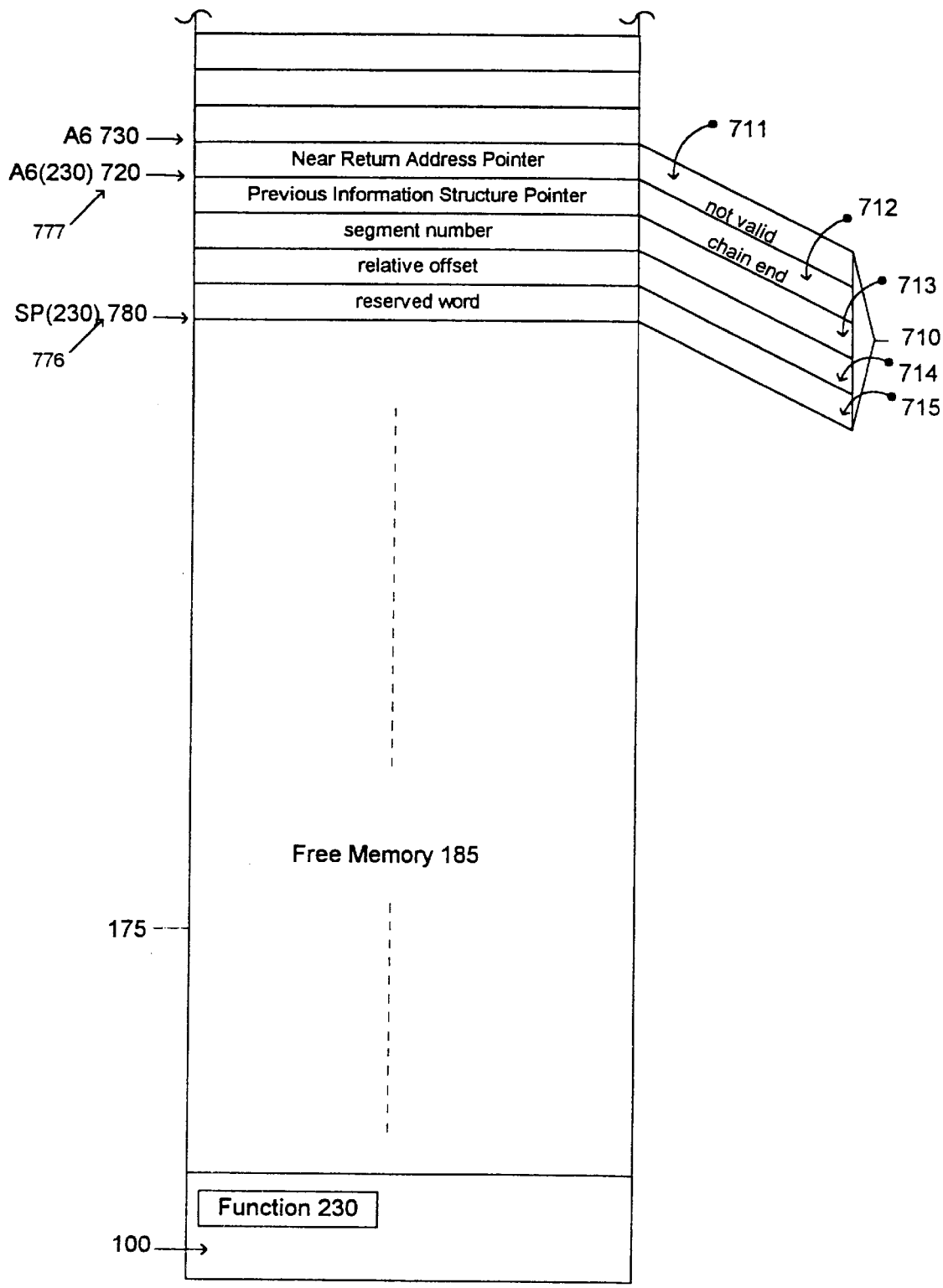
FIG. 7 is an illustrative example of the preferred embodiment of the present invention showing the state of an application space with one segment loaded and one function in a current call chain.

The preferred embodiment imports a swapper program 395 into an application program 390. In conjunction with the operating system 320, the imported swapper program 395 provides for swapping segments between secondary storage 340 and main memory 350. The preferred embodiment generates an information structure upon entry to each function contained within a segment that has been designated as swappable (steps 368 and 370 of FIG. 3B). FIG. 7 shows the structure of an information structure 710 in more detail. These information structures are comprised of four fields; (1) a Near Return Address Pointer 711 for storing a value of a stack pointer prior to a call instruction, (2) a Previous Information Structure Pointer 712 for storing an address of a previous information structure in a chain of information structures, (3) a segment number field 713 for storing an identifying number of the segment containing the function, and (4) a relative offset field 714 for storing an index to a proper returning point the function. The Near Return Address Pointer 711, the Previous Information Structure Pointer 712, and the relative offset 714 are all four bytes in length. The segment number 713 is only two bytes in length. Additionally, the preferred embodiment reserves two bytes of data 715 in each Information Structure 710 in order to keep the information structures long aligned; that is, to keep the size of each structure the preferred size for a data access. It should be appreciated that the above field sizes are illustrative only of the current embodiment. Those skilled in the art will appreciate that the sizes of the above described fields may vary depending on the environment in which one implements the invention.

In order to easily access the data of each information structure, the preferred embodiment creates a chain of information structures by linking each information structure to a preceding information structure (step 372 of FIG. 3B). As will be explained in more detail below, the preferred embodiment links the information structures by storing addresses in each Previous Information Structure Pointer. The preferred embodiment of the present invention then stores the linked information structures on the stack. Furthermore, by dynamically generating the structures onto the stack as they are needed (e.g., upon entry to a function) and releasing the information structures from the stack when they are no longer needed (e.g., upon exit of a function) the present embodiment uses the main memory of the computer system in a highly efficient manner (steps 368, 370, 392 and 394). To simplify the creation and maintenance of these structures, the preferred embodiment of the present invention provides prologue and epilogue subroutines for the application programmer. These subroutines will be explained in detail below. Having described the composition, chaining, and allocation of the information structures, the use of the chained structures will now be described generally.

Entry to the swapper program (395 of FIG. 3A) can be triggered if the application program (390) makes a call to a swapped-out segment (steps 364, 366 and 374 of FIG. 3B). In this case, the preferred embodiment determines if there is enough free memory to accommodate swapping-in the non-loaded segment (step 376). If sufficient free memory does not exist, the preferred embodiment of the present invention selects a segment to be swapped out of memory (step 378). The embodiment determines which segment should be selected based on the likelihood that the application will access the selected segment in the near future. More specifically, the preferred embodiment makes this determination by identifying a least-recently-called segment. The preferred embodiment identifies the least recently called segment using an array and a global counter. The array contains an element for each swappable segment. The preferred embodiment of the present invention increments the global counter each time a GLOBALLY declared function of a swappable segment is accessed (e.g., each time that a GLOBALLY declared function is called by another function). After incrementing the global counter, the preferred embodiment stores the value of the global counter in the array element which represents the swappable segment that contains the GLOBALLY declared function. By subtracting respective array element values from the global counter value, the preferred embodiment determines the least recently-called segment. The preferred embodiment then selects this segment for unloading.

After selecting the appropriate segment, the preferred embodiment walks the chain of information structures to determine if any of the functions in the selected segment have a pending return; that is, if other functions will attempt to return into the selected segment (step 380). The preferred embodiment determines functions with pending returns by examining return addresses which are located in proximity to the addresses stored in the Near Return Address Pointers 711 of FIG. 7.

If a function of the selected segment has a pending return address, the preferred embodiment (1) translates this address into a segment number and a relative offset and (2) stores the translated address in the information structure generated for the invocation of the function (step 382 of FIG. 3B). Additionally, the preferred embodiment replaces the pending return address with a pointer to a restoring code program (step 382). Subsequently, the preferred embodiment swaps-out the selected segment (step 384) and swaps-in the called segment (step 386). At this point, the application program continues processing in its usual fashion until an executed instruction or a memory condition triggers entry into the swapper (steps 364 and 366).

Additionally, entry to the swapper program (395 of FIG. 3A) can be triggered if a called function is attempting to return to a calling function of a swapped out segment (steps 366, 368, and 388). In this case, the preferred embodiment directs processing to a restoring code program (step 390). The restoring code program retrieves the stored segment number and the stored relative offset from the appropriate information structure. Subsequently, the preferred embodiment of the present invention swaps-in the segment referenced by the retrieved segment number in the manner previously described (steps 376–386). As will be explained in detail below, this swapping-in process (step 386) creates a valid return address by adding the retrieved offset to the starting address of the swapped-in segment. Having described the invention generally, the preferred embodiment will now be explained as it interacts with a Macintosh 68000 computer system.

In the preferred embodiment of the present invention, the programmer determines which segments of the application code should be swapping-enabled. So as to minimize the number of times the segments are swapped in and out of memory, the application programmer enables code segments containing functions that the application does not frequently use (e.g., printing functions). Conversely, the application programmer does not enable segments which contain routines that the application frequently uses (e.g., generic sorting functions). Once the application programmer has made these determinations, the programmer designates the determined segments as swapping-enabled by setting a compiler switch on a swapper compiler (step 356 of FIG. 3B). The purpose of the swapper compiler, as previously described in the general discussion of compilers, is to translate the source code of the segment into a format that the computer system 300 of FIG. 3A can understand. The compiler switch is simply a parameter passed to the swapper compiler which informs the swapper compiler to compile the code in a certain fashion (i.e., as swapping-enabled). After all the segments are compiled, a swapper linker links the compiled segments into an executable program (steps 358 and 360 of FIG. 3B). Subsequently, the swapper 395 of FIG. 3A loads the first segment of an application 390 (segment 100 of FIG. 3A) from secondary storage 340 to main memory 350 (step 362). At this point the CPU 309 executes the code of the application (step 364).

In the example below, the application programmer is assumed to have selected segments 100, 110, 120, and 130 of FIG. 2 as swapping-enabled. Additionally, the example assumes that the functions follow the call chain path illustrated by arrows 222 in FIG. 2. While this call chain path was previously described as being present in a conventional computer system, those skilled in the art will appreciate that such a call chain is defined by the coded instructions of an application program and not by the particular computer system that the application program is executed in. The example below also utilizes the conventional jump table entries (151 and 152). Furthermore, the example frequently references A6(n) and SP(n). The reference A6(n) relates the location of the frame pointer for of a function (n). In order to identify which function the frame pointer A6(n) belongs to, "n" will be replaced with the relevant function number (i.e., 230, 240, 250 or 260). Similarly, the reference SP(n) relates a last used memory location of the information structure generated for function (n). Here "SP" stands for Stack Pointer.

Additionally, the preferred embodiment of the present invention uses a reserve block scheme in order to ensure that the largest swappable segment can be loaded on demand. More specifically, the preferred embodiment reserves a block of memory large enough to hold the largest swappable segment. To make efficient use of this reserved block, the preferred embodiment loads the largest swappable segment into he reserved block when the application is invoked by the user. However, since this lock of memory is designated as reserved, it is not identified part of the previously described Free Memory 185. Therefore, the memory of the reserved block is not considered as available memory during normal swapping operations. Instead, the reserve block is only used for swapping when it is absolutely necessary to do so. For example, if, after unloading all swappable segments, the preferred embodiment is unable to create sufficient Free Memory 185 to load a desired segment, the preferred embodiment (1) unloads the segment that currently occupies the reserved block and (2) swaps-in the desired segment into the reserved block. In this manner, the preferred embodiment ensures that it can always load a desired segment upon demand. The example below assumes that segment 100 is the largest swappable segment and that segment 100 is loaded in the reserve block. As a final introductory comment to the example, note that the CPU 309 executes the coded instructions contained within the functions of the application (e.g., functions 230, 240, 250 and 260 of Figure 2). However, in the interests of brevity, the example discusses a function as "executing its code." One skilled in the art will appreciate that this phrase is shorthand for "the CPU executes the code of the function."

Figure 4:
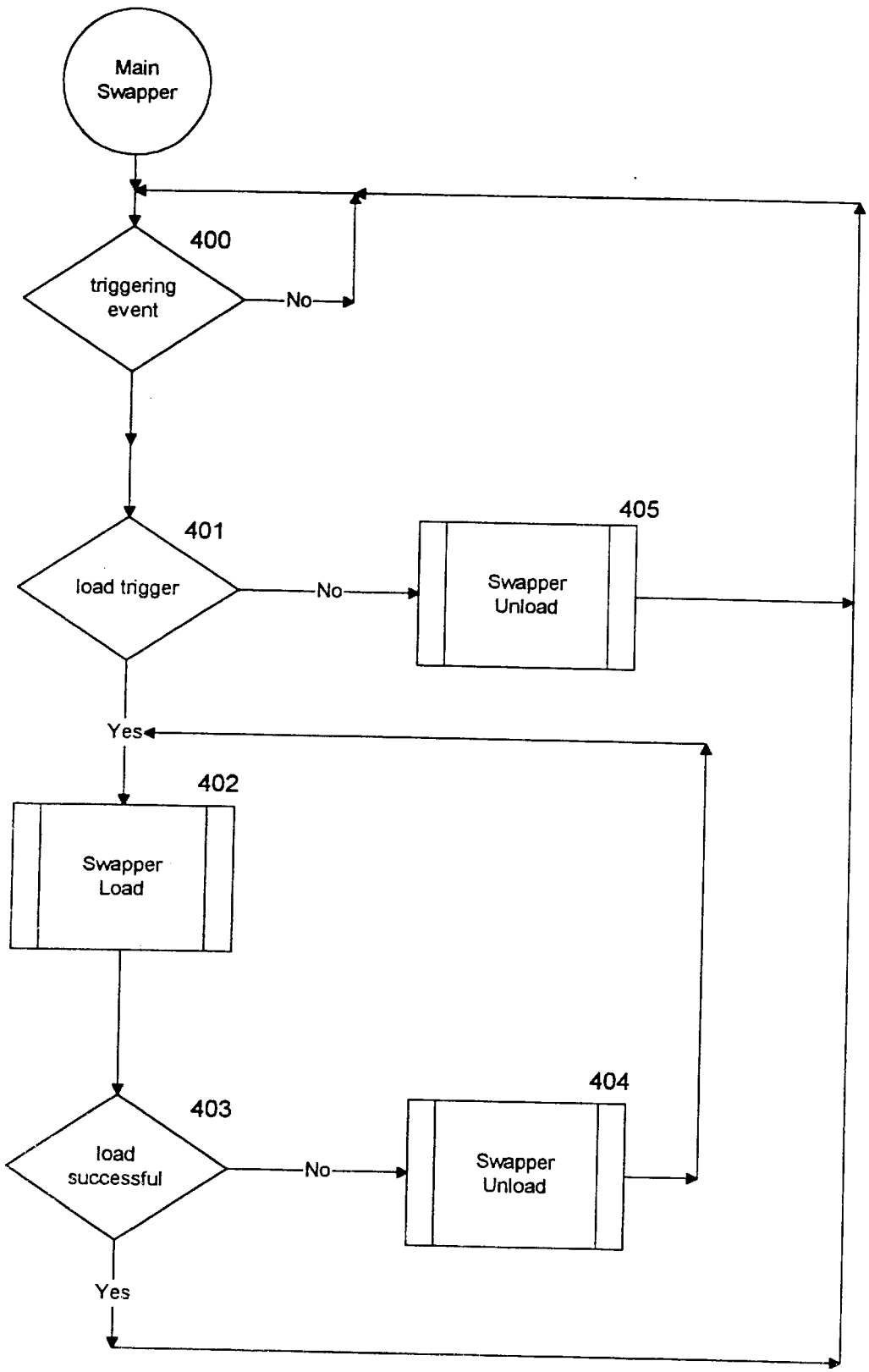
FIG. 4 is a flow diagram for the main processing of the preferred embodiment of the present invention.

The example begins with the Main Swapper Program of FIG. 4 which is a flow chart of the main processes of the swapper. The purpose of this processing loop is to load and unload segments as needed by the application program. In order for the Main Swapper Program to swap a segment of code, the application program must directly or indirectly initiate a triggering event (step 400). Examples of transparent triggering events are a call to an unloaded segment (step 374 of FIG. 3B), a return to an unloaded segment (step 388 of FIG. 3B). Alternatively, an application may directly access the Main Swapper Program of FIG. 4 by explicitly requesting to load or unload a segment.

Upon entry, the Main Swapper Program determines if the triggering event is requesting a load (step 401). For example, in the case of loading a first segment into memory (e.g., segment 100 of FIG. 3A) the Main Swapper Program transfers control to the Swapper Load Program (step 402 of FIG. 4).

Figure 5:
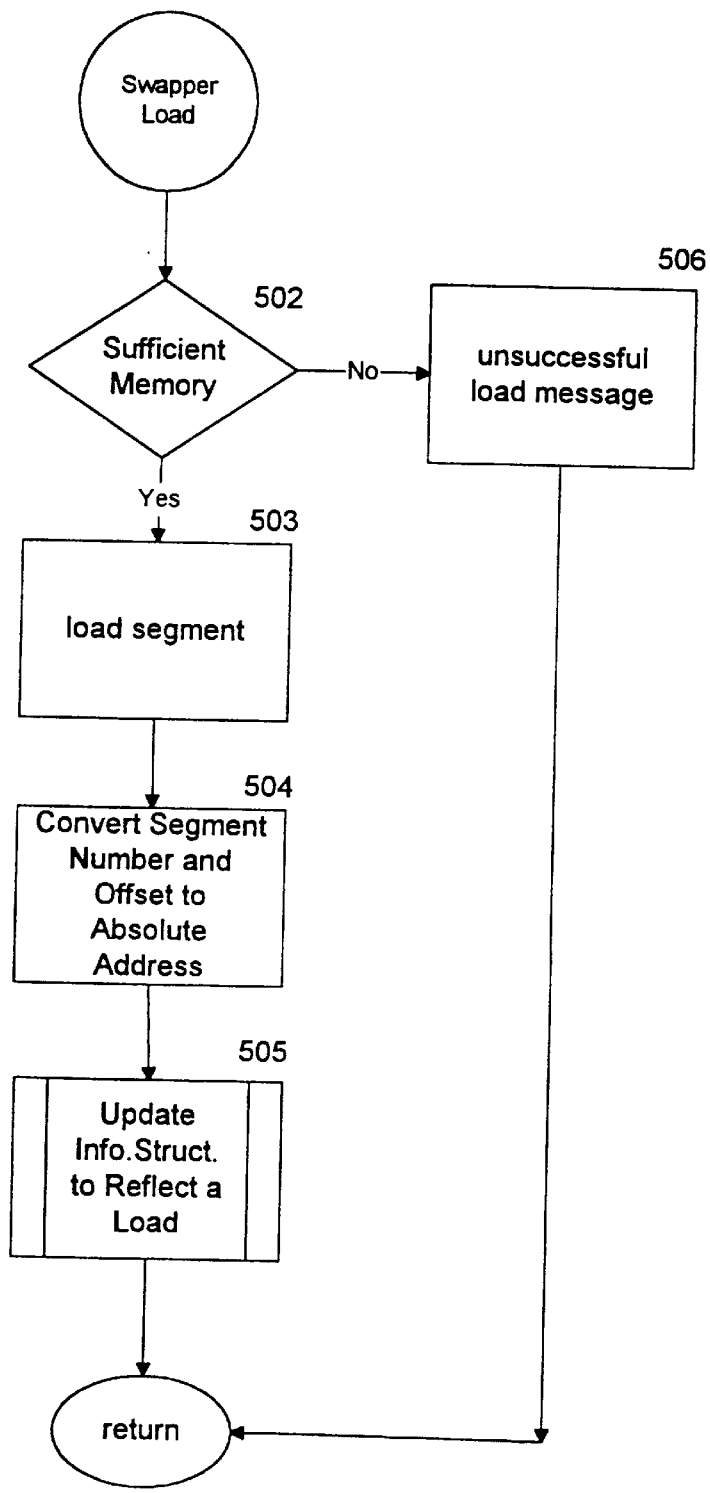
FIG. 5 is a flow diagram for a segment loading program of the preferred embodiment of the present invention.

The purpose of the Swapper Load Program of FIG. 5 is to load a segment of the application program from secondary storage 340 of FIG. 3A to main memory 350. The Swapper Load Program expects as input (1) a segment number which identifies the requested segment to load and (2) a relative offset which provides a proper entry point into the requested segment. Continuing with the example of loading segment 100 of FIG. 3A, the Swapper Load Program determines that there is sufficient memory to load the segment (step 502). As a result, the Swapper Load Program of FIG. 5 loads segment 100 of FIG. 3A into the application heap 175 of FIG. 7 (step 503 of FIG. 5). Upon loading segment 100, the Swapper Load Program translates each jump table entry of segment 100 from the unloaded format to the loaded format, in the manner previously described relative to FIG. 1, blocks 151 and 152. After the load, the amount of memory now remaining for the application is designated by Free Memory 185 in FIG. 7. Next, the Swapper Load Program converts the segment number and the offset that the Program received as input into an absolute address where processing control should continue (step 504 of FIG. 5). For purposes of the example, assume that the transferred relative offset is such that the Swapper Load Program sets execution to a first function of segment 100 in FIG. 7 (i.e., function 230). Subsequently, the Swapper Load Program transfers control the Update Chain-Load Program (step 505).

Figure 6:
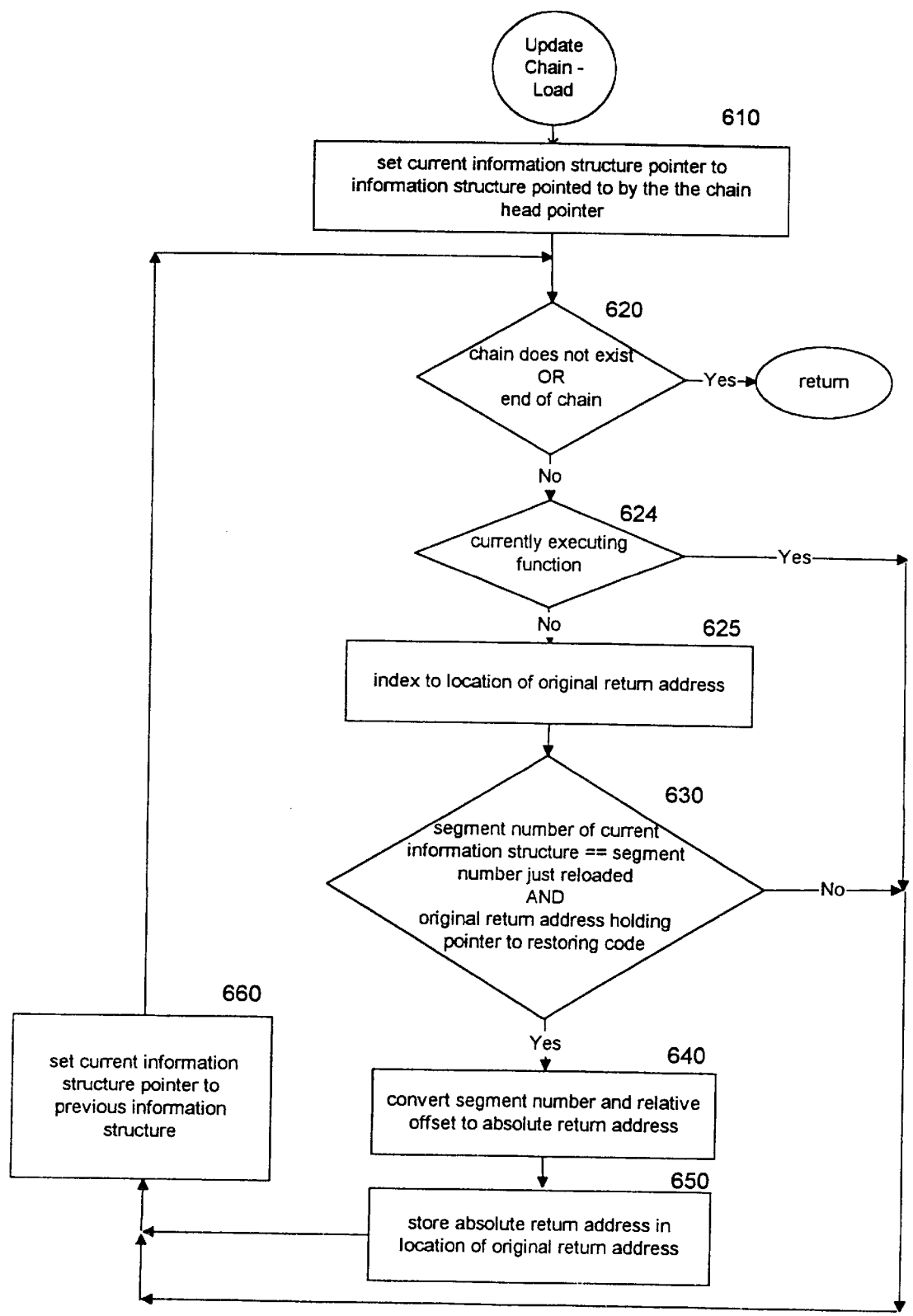
FIG. 6 is a flow diagram of the preferred embodiment of the present invention for a program that updates a chain of information structures after a segment is loaded.

The Update Chain-Load Program of FIG. 6 restores previously translated return addresses of functions contained within the segment that has just been loaded. More specifically, the Update Chain-Load Program restores relative return addresses (i.e., return addresses in a segment and offset format) into valid absolute return addresses. Each valid absolute address identifies a location in main memory where the Swapper Load Program has reloaded the coded instruction referenced by a previously translated relative return address.

The Update Chain-Load Program begins processing by setting a Current Information Structure Pointer to the information structure pointed to by the Chain Head Pointer (step 610). The Program then determines if an information structure chain does not yet exist or if the Program has checked all the information structures in an existing chain (step 620). In the example, a chain does not yet exist as segment 100 of FIG. 2 is the first segment that the preferred embodiment of FIG. 3A is loading into memory. Therefore, the Update Chain-Load Program of FIG. 6 returns processing control to the Swapper Load Program of FIG. 5. Subsequently, the Swapper Load Program returns control to the Main Swapper Program of FIG. 4. In turn, the Main Swapper Program determines that the load was successful and waits for the next triggering event (steps 403 and 400).

Meanwhile, the application code continues its processing at function 230 in segment 100 of FIG. 7 (step 364 of FIG. 3B). As explained previously, the preferred embodiment of the invention allocates the majority of the memory management responsibilities to the operating system 320 of FIG. 3A. However, the application program is responsible for some minor housekeeping responsibilities. More specifically, the application program is responsible for (1) linking the information structures, (2) allocating and deallocating stack space for the information structures, and (3) saving an address contained within the stack pointer.

In the preferred embodiment, the invention has greatly simplified these responsibilities by providing prologue and epilogue subroutines as part of a swapper library. The swapper library is a library of routines used by the swapper (395 of FIG. 3A). As such, the preferred embodiment the present invention automatically adds these routines to each swapping-enabled segment when linking the compiled segments (step 360 of FIG. 3B). Moreover, by simply calling the respective prologue or epilogue subroutine upon entry or exit of a function, the application accomplishes the linking of the information structures and the allocation/deallocation of stack space (steps 372 and 394). The actual code of these subroutines can be implemented in a number of ways. For example, coded in 68000 Assembly, the linking code of a prologue subroutine may look like:

move.1 pointer-to-chain-head, -8 (A6); previous chain head moved into previous information structure pointer move.1 A6, pointer-to-chain-head; adjust pointer to chain head to point to this information structure Similar to the linking of the structures, stack allocation may be accomplish ed in a number of ways. For instance, the preferred embodiment accomplishes the stack allocation using a LINK A6, #nn instruction. However, those skilled in the art will appreciate that in the above instruction the register A6 may be substituted with any available register to achieve similar results. This link instruction, when p laced at the entry to a friction, offsets the stack pointer by nn number of bytes whenever the function is executed. The use of a LINK A6, #nn instruction is a common method of allocating stack space for local variables on the Macintosh system. As a result, stack space for an information structure may be allocated simply by increasing an existing #nn parameter. In the preferred embodiment of the present invention, the swapper compiler automatically increases existing #nn parameters contained within swapping-enabled segments. Alternatively, the application programmer may manually increase existing #nn parameters. For brevity, function 230 is assumed to have no local variables other than the generated Information Structure 710. Therefore, where the prefix 0x identifies a hexadecimal number, a LINK #0x10, A6 instruction allocates the requisite 16 bytes for the information structure 710, leaving Stack Pointer 776 pointing at location SP(230) 780.

Additionally, this link instruction leaves register A6, the previously described frame pointer, pointing to the memory address preceding the Near Return Address Pointer 730 of FIG. 7. However, in order to facilitate the applications stack pointer storing responsibilities, the prologue subroutine adjusts A6 730 to point to the location referenced by A6(230) 720. Thus, placing A6(230) 720 pointing to the Near Return Address Pointer 711. Again this adjustment may be implemented in a number of ways. Using 68000 assembly, the adjustment may be implemented using the instruction:

subq.1 #4,(A6); adjusting frame pointer to point to Near Return Address Pointer

By adjusting A6 in this manner, stack saving code of the application is reduced to a single instruction as will be explained below.

After the preferred embodiment of the present invention allocates stack space for an information structure, the preferred embodiment generates the information structure upon entry of the function (step 370 of FIG. 3B). This information structure may be generated in a number of ways. For example, in the preferred embodiment of the present invention, the swapper compiler automatically declares an information structure as part of the local variables for each function contained within a swapping enabled segment. In the C programming language, the information structure declaration may be as simple as SIS information_structure
wherein the structure SIS is defined using a TYPEDEF statement such as

```
typedef struct_SIS
{
  void       **pNearRetAddr   /* ptr to ret. address into this
                                 function */
  struct_SIS *psisA6prev      /* ptr. to prev. info. structure */
  BPC        bpc              /* 4 bytes: offset for unloaded return
                                 address */
  ISEG       iseg             /* 2 bytes: segment number for
                                 unloaded ret. address */
  WORD       wReserved        /* 2 bytes reserved for alignment */
}SIS;
```

Using a declaration of this type, the preferred embodiment of the present invention generates Information Structure 710 of FIG. 7 for the invocation of function 230 contained in loaded segment 100 of FIG. 7 (step 370 of FIG. 3B). Additionally, note that at this point the Near Return Address Pointer 711 does not contain meaningful data. The contents of this Near Return Address Pointer 711 does not contain meaningful data because function 230 is a currently executing function and therefore has no pending return address. For clarity, FIG. 7 shows this Near Return Address Pointer 711 as being invalid. After the present embodiment generates the Information Structure 710, the prologue subroutine sets the Chain Head Pointer 777 to point to location 720.

At this point, the application program executes the code of function 230 (step 364 of FIG. 3B). As illustrated in FIG. 2, function 230 eventually calls function 240. However, prior to calling function 240, function 230 must store the contents of the Stack Pointer 776 of FIG. 8, SP(230) 780, in the Near Return Address Pointer 711. Because the preferred embodiment adjusted the original A6 as previously described, the stack pointer saving code may be comprised of a single instruction. For example, in 68000 assembly the stack pointer saving code is:

move.1 A7, (A6(230))

Where the A7 register is used as a stack pointer. Once function 230 has stored the contents of the stack pointer, function 230 calls function 240. In making this call, function 230 stores its return address at location 801 of FIG. 8. The call to function 240 triggers entry to the Swapper Load Program of FIG. 5 (steps 366 and 374 of FIG. 3B, steps 400, 401 and 402 of FIG. 4).

Figure 1:
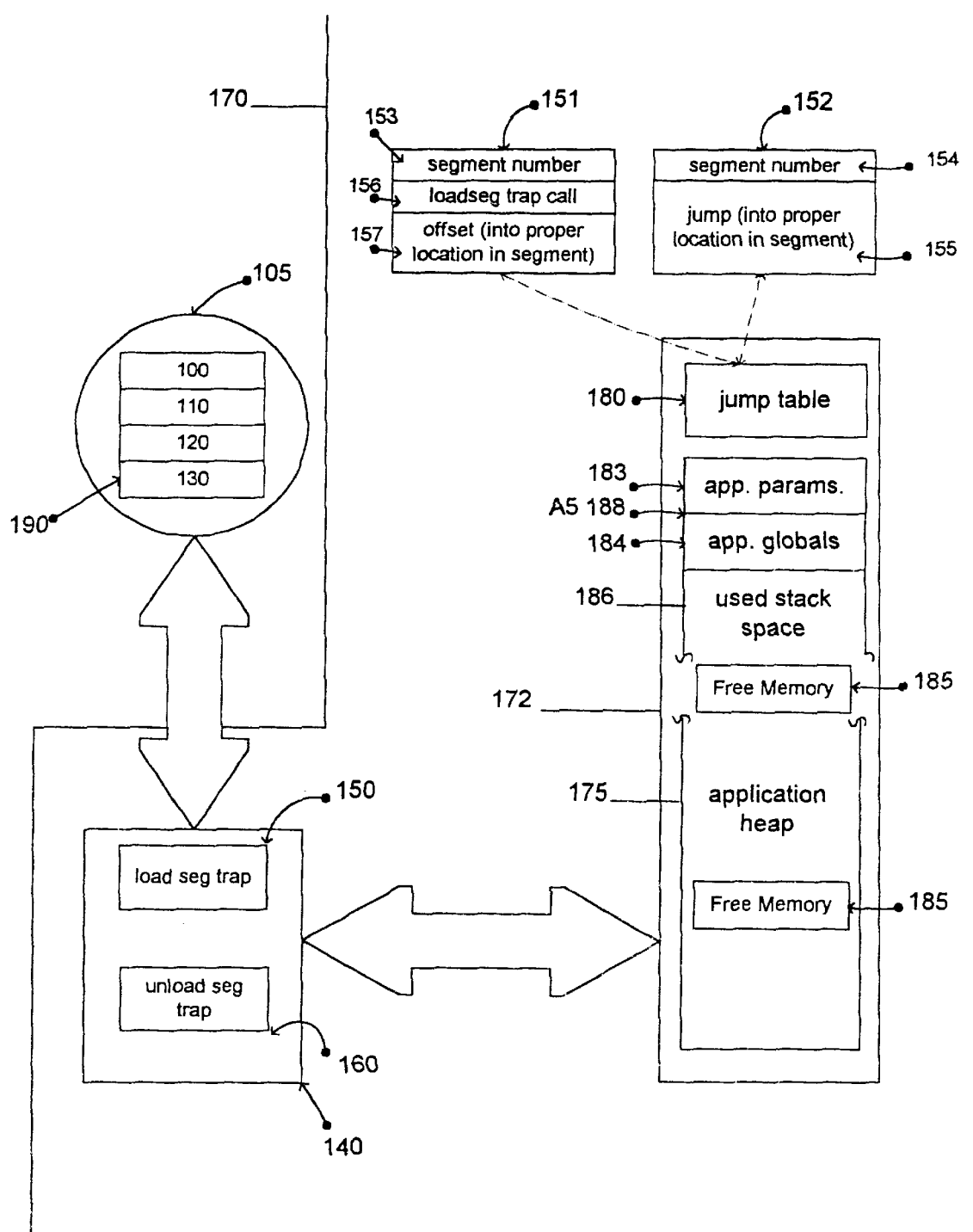
FIG. 1 is a block diagram of a portion of a conventional computer system that runs an application program.
Figure 8:
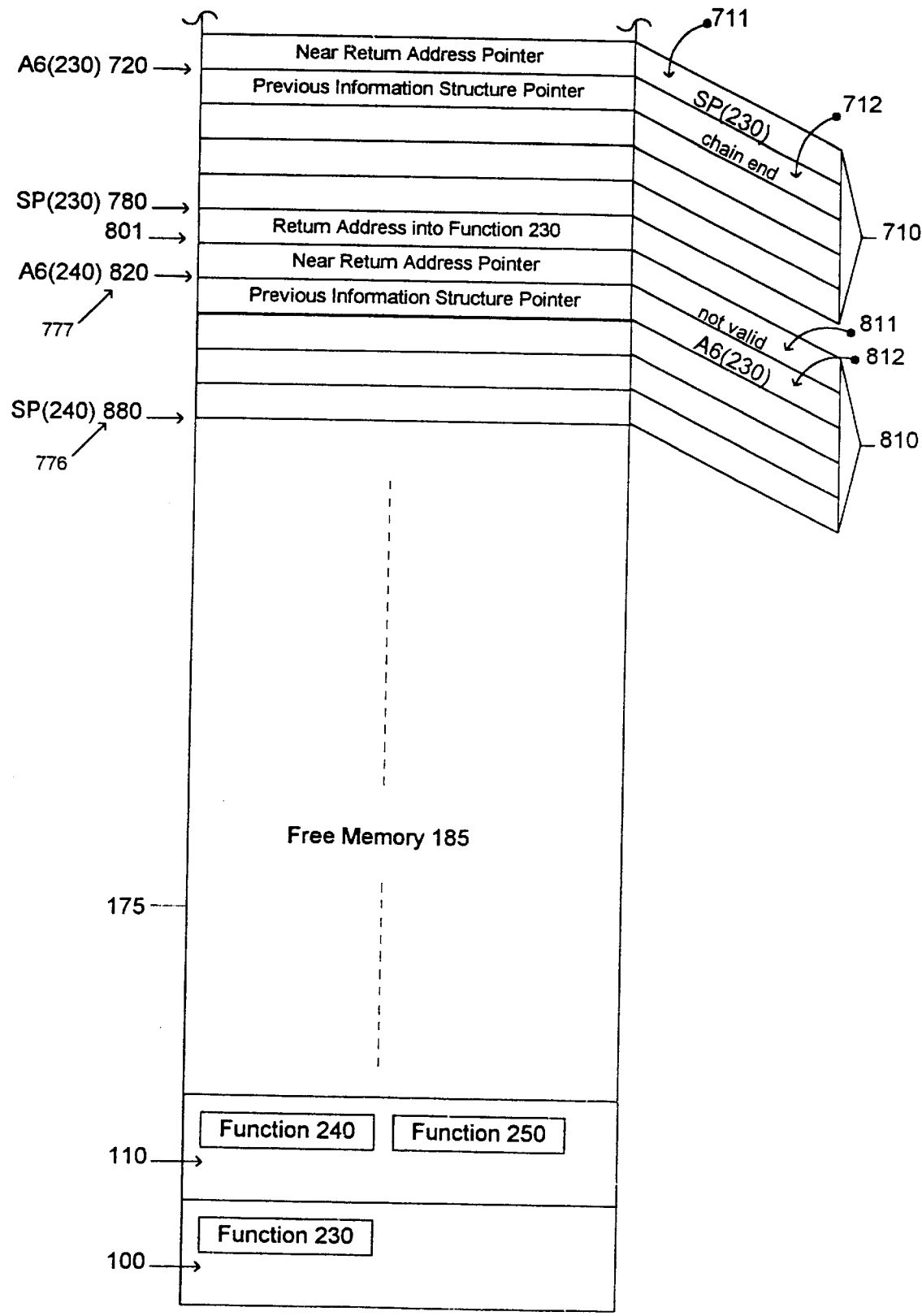
FIG. 8 is an illustrative example of the preferred embodiment of the present invention showing the state of the application space with two segments loaded and two functions in the current call chain.

In this case, the Swapper Load Program of FIG. 5 loads segment 110 of FIG. 3A into the application heap 175 of FIG. 8 using an unloaded jump table entry, 151 of FIG. 1, in the manner previously described. The preferred embodiment generates Information Structure 810 of FIG. 8 upon entry to function 240 in the manner previously described (step 370 of FIG. 3B).

As explained above, the prologue subroutine of the swapper library chains the information structures together in a linked list (step 372). In the example, the prologue subroutine links Information Structure 810 of FIG. 8 to Information Structure 710 by storing the address referenced by A6(230) 720 in the Previous Information Structure Pointer 812 of Information Structure 810. The prologue subroutine also adjusts the Chain Head Pointer 777 to point to the location referenced by A6(240) 820. The previously described LINK A6, #nn instruction leaves Stack Pointer 776 pointing to a location referenced by SP(240) 880. Additionally, note that the Near Return Address Pointer 811 does not contain meaningful data as function 240 is now the currently executing function. Finally, observe that the loading of segment 110 has reduced the amount of Free Memory 185 available to the application program.

Figure 9:
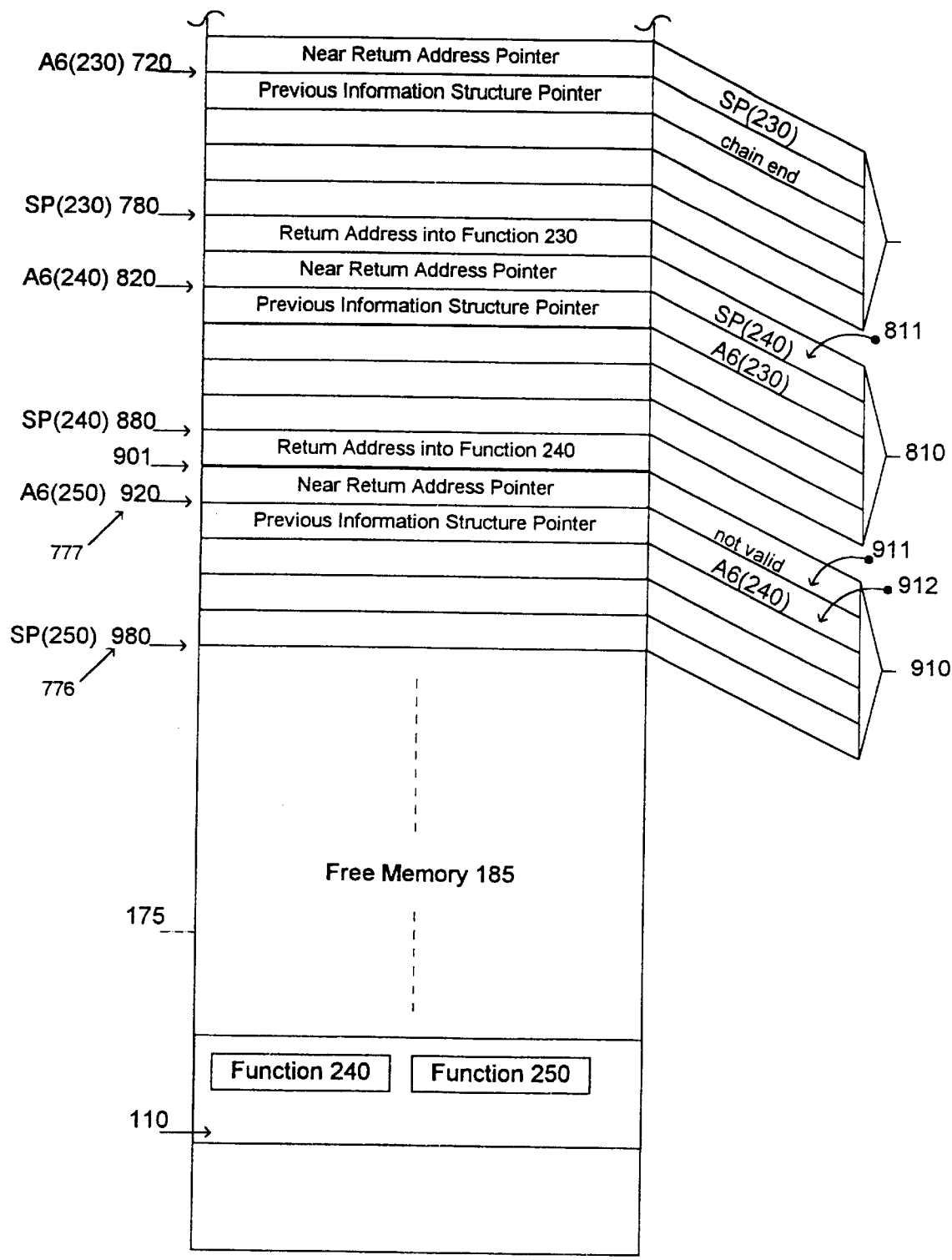
FIG. 9 is an illustrative example of the preferred embodiment of the present invention showing the state of the application space with two segments loaded and three functions in the current call chain.

At this point, function 240 executes its code and eventually transfers control to function 250 (step 364 of FIG. 3B). Immediately prior to this call, function 240 of FIG. 8 stores the contents of the Stack Pointer 776, SP(240) 880, in the Near Return Address Pointer 811 as shown in FIG. 9. In making the call to function 250, the preferred embodiment pushes the return address into function 240 on the stack, as referenced by 901. The preferred embodiment recognizes that segment 110 is already loaded because, as previously described, the load of a segment translates all jump table entries of the segment to the loaded format (block 152 of FIG. 1).

The preferred embodiment of the present invention then generates Information Structure 910 of FIG. 9 for the invocation of function 250 in the manner previously described (step 370 of FIG. 3B). Again, the Near Return Address Pointer 911 of FIG. 9 is not valid at this point as there is no return address into a currently executing function. The prologue subroutine links Information Structure 910 to Information Structure 810 by storing the address referenced by A6(240) 820 in the Previous Information Structure Pointer 912 (step 372 of FIG. 3B). Additionally, the prologue subroutine updates the Chain Head Pointer 777 of FIG. 9 to point to location A6(250) 920. The previously described LINK A6, #nn instruction adjusts Stack Pointer 776 to point to location SP(250) 980.

Figure 2:
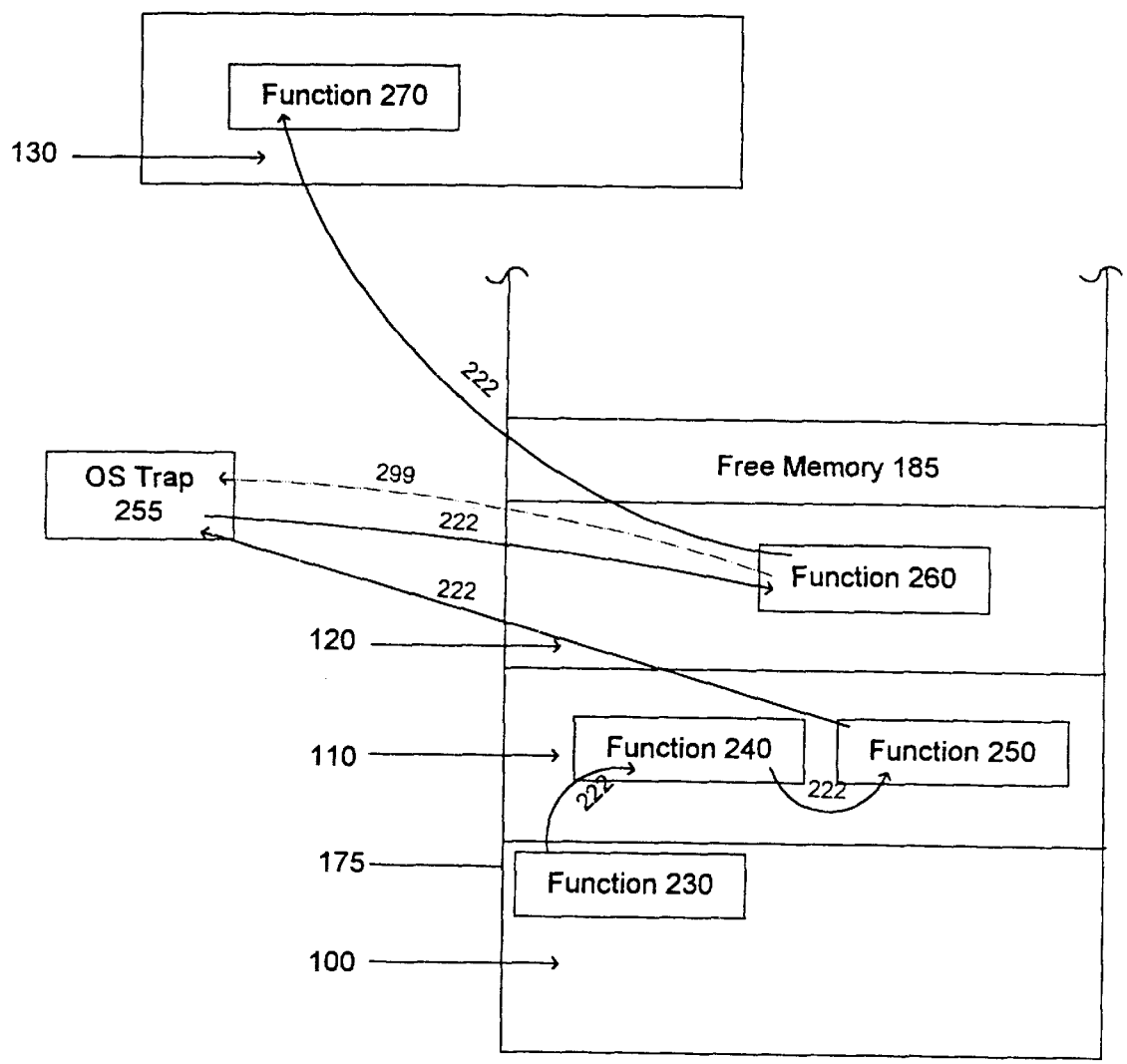
FIG. 2 illustrates a current call chain.

At this point, function 250 executes its instructions and eventually calls OS trap 255 of FIG. 2 (step 364 of FIG. 3B). Again, prior to executing a call, a function must store the contents of the stack pointer in the information structure. In this case, function 250 of FIG. 9 loads the contents of the Stack Pointer 776 (i.e., location SP(250) 980) in Near Return Address Pointer, 911 of FIG. 10. The call instruction pushes the return address into function 250 onto the stack as referenced by 1001. Subsequently, the OS trap 255 of FIG. 2 executes its code and eventually calls back into the application program 390 of FIG. 3A. More specifically, the OS trap 255 of FIG. 2 calls function 260. In its execution, the OS trap 255 utilizes the portion of stack space represented by block 1002 of FIG. 10. However, because the OS trap does not build an information structure, the contents of this stack space are not illustrated in detail. What is important to remember, however, is that after the OS callback, the application 390 of FIG. 3A cannot rely on the value of any register. Thus, all conventional frame pointer chains are broken by virtue of the OS callback.

When OS trap 255 of FIG. 2 calls function 260, the preferred embodiment recognizes that segment 120 is an unloaded segment via an unloaded jump table entry for function 260 (jump table entries 151 and 152 of FIG. 1 explained above). Therefore, the preferred embodiment loads segment 120 in the manner previously described (steps 401 and 402 of FIG. 4, FIGS. 4, 5 and 6). The resulting effect of this load on the application heap 175 and the Free Memory 185 is shown in FIG. 10.

Figure 10:
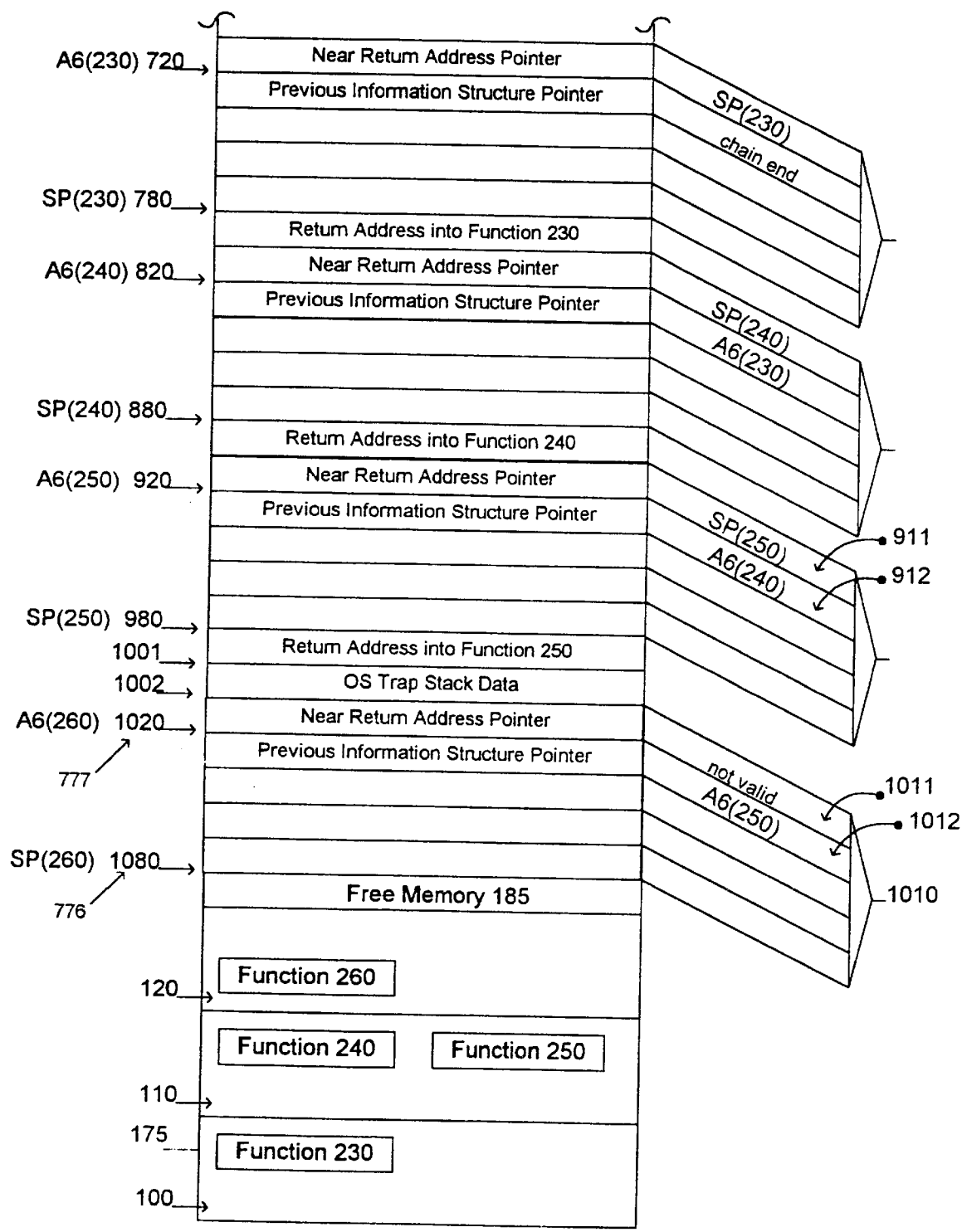
FIG. 10 is an illustrative example of the preferred embodiment of the present invention showing the state of the application space with three segments loaded and four functions in the current call chain.

Having loaded segment 120, the preferred embodiment generates Information Structure 1010 of FIG. 10 upon entry to the function 260 (steps 368 and 370 of FIG. 3B). For this information structure, the preferred embodiment stores the address referenced by A6(250) 920 of FIG. 10 in the Previous Information Structure Pointer 1012 (step 372 of FIG. 3B). To complete the linking of the structures, the preferred embodiment updates the Chain Head Pointer 777 of FIG. 10 to point to location A6(260) 1020. Additionally, note the Near Return Address Pointer 1011 is not valid at this point and that the Stack Pointer 776 points to location SP(260) 1080.

With all three segments loaded into the application heap 175, the Free Memory 185 of FIG. 10 has dropped significantly when compared to the Free Memory 185 available in FIGS. 7, 8 or 9. Thus, when function 260 of FIG. 2 calls a function of an unloaded segment (e.g., the function 270 of segment 130 in FIG. 2) there is not enough Free Memory 185 to load the segment. At this point, the prior art cannot easily load segment 130 as segments 100, 110, and 120 all have functions in the current call chain. The preferred embodiment, however, can easily load segment 130 through innovative swapping of a segment in a current call chain. This innovative swapping process will now be described.

By calling function 270 in unloaded segment 130 of FIG. 2, function 260 triggers entry (step 374 of FIG. 3B) to the Main Swapper Program of FIG. 4 which transfers control to the Swapper Load Program of FIG. 5 in the manner previously explained. However, on this invocation of the Swapper Load Program, the program recognizes that there is insufficient memory to load the segment, generates an unsuccessful load message, and returns processing control the Main Swapper Program (steps 502 and 506 of FIG. 5). Upon recognizing an unsuccessful load the Main Swapper Program calls the Swapper Unload Program (steps 403 and 404 of FIG. 4).

Figure 11:
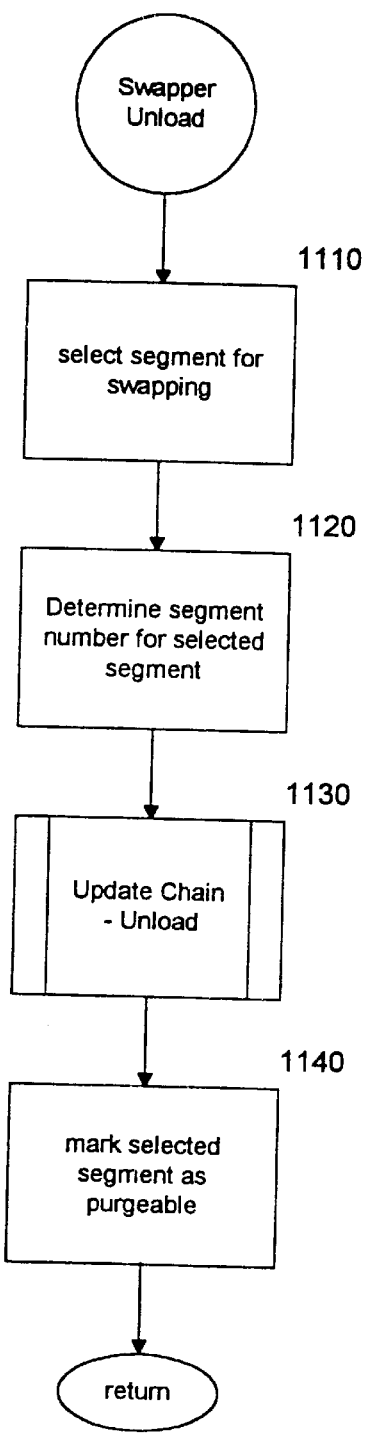
FIG. 11 is a flow diagram for a segment unloading program of the preferred embodiment of the present invention.

The Swapper Unload Program of FIG. 11 selects a segment for swapping, determines a segment number for the selected segment, updates the chain of information structures accordingly, and marks the selected segment as purgeable. The Program begins by selecting a segment for swapping (step 1110 of FIG. 11). In the preferred embodiment, the present invention selects the least recently called segment, in the manner previously described. For this example, assume that the application has accessed segments 100 and 120 of FIG. 13 more recently than segment 110 of FIG. 13 (e.g., assume that the application has accessed and returned from Function 230 after the OS trap 255 called function 260). Under these conditions, the Swapper Unload Program selects segment 10 for unloading. This selected segment is illustrated by reference 1320 of FIG. 13.

Next, the preferred embodiment of the present invention determines a segment number for the selected segment (step 1120 of FIG. 11). In the preferred embodiment, the segment number is the same segment number used in the jump table entries 151 and 152 of FIG. 2. Subsequently, the Swapper Unload Program calls the Update Chain-Unload Program (step 1130 of FIG. 11).

Figure 12:
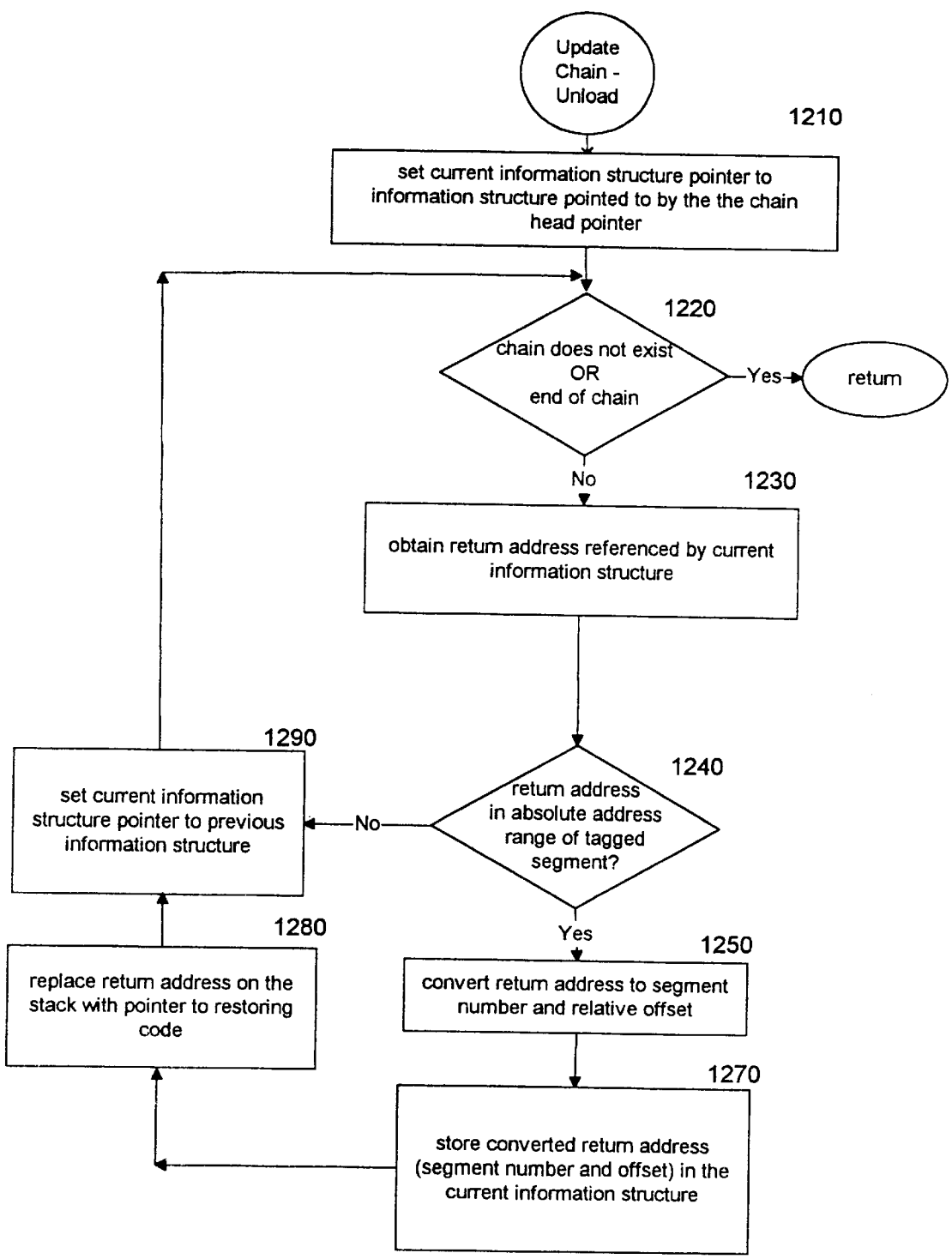
FIG. 12 is a flow diagram of the preferred embodiment of the present invention for the program that updates the chain of information structures after a segment is unloaded.
Figure 16:
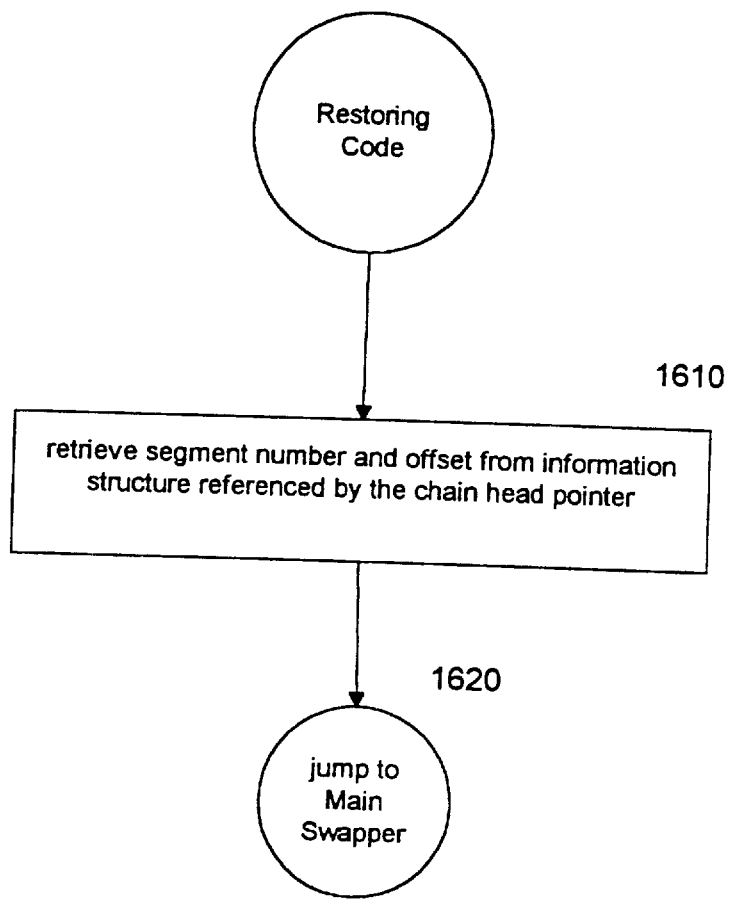
FIG. 16 is a flow diagram of the preferred embodiment of the present invention for the code that directs the reloading of an unloaded segment and restores associated segment numbers and offsets into valid absolute addresses.

The purpose of the Update Chain-Unload Program of FIG. 12 is to determine if any functions of the selected segment have pending return addresses. For each determined pending return address, the Update Chain-Unload Program (1) converts the determined pending return address into a segment number and a relative offset, (2) stores the converted address in the information structures generated for the function, and (3) replaces the return address on the stack with a pointer to a restoring code module. As will be explained in detail below, this pointer directs the processing to reload the unloaded segment and return processing control to a location which is equivalent to the original pending return address (FIG. 16).

Figure 13:
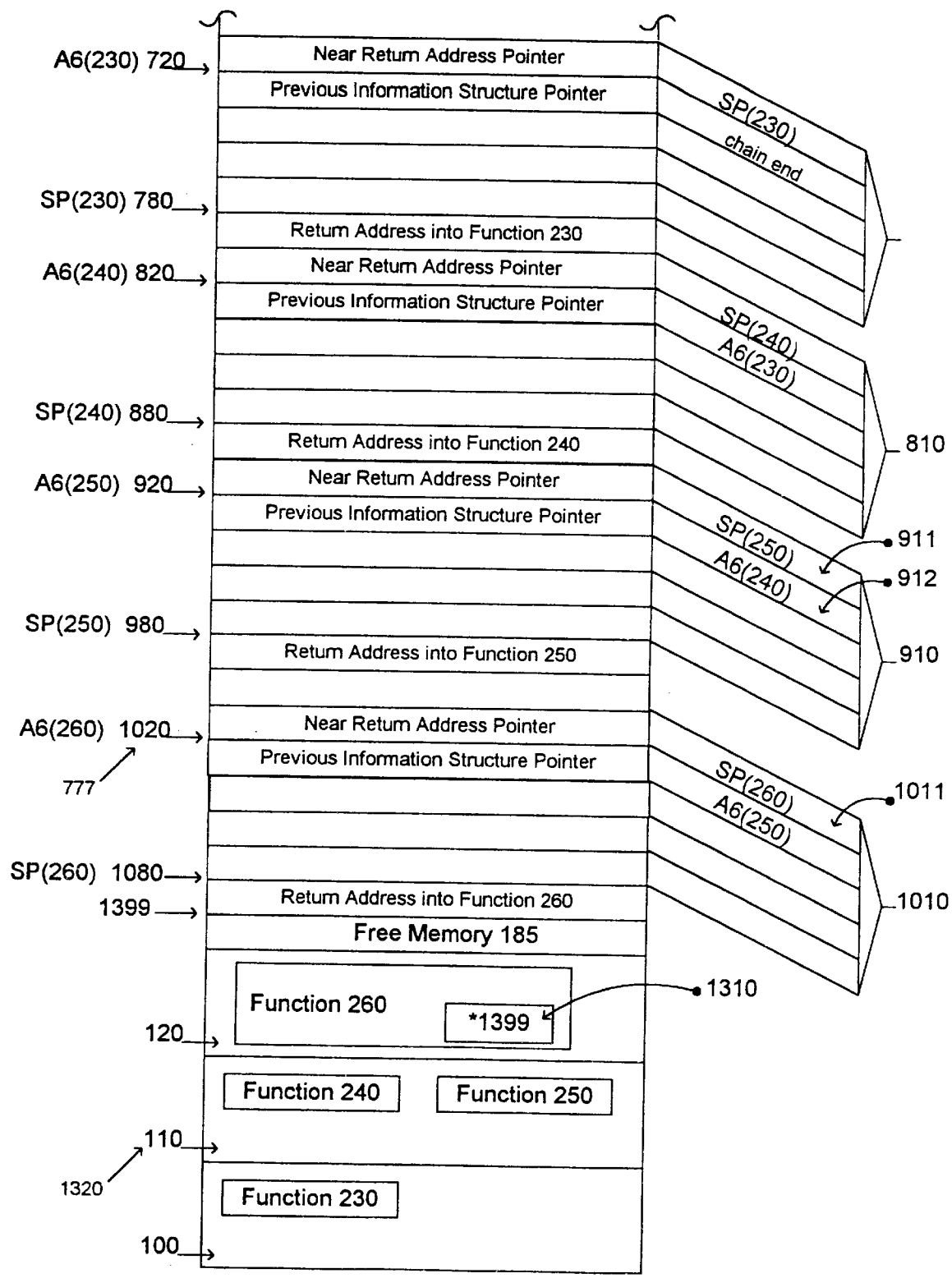
FIG. 13 is an illustrative example of the preferred embodiment of the present invention showing the state of the application space after the fourth function of the call chain has called a fifth function and after the preferred embodiment has selected a segment for unloading.

Turning to the specifics of the Update Chain-Unload Program, the program begins processing by setting the Current Information Structure Pointer equal to the information structure referenced by the Chain Head Pointer 777 of FIG. 13 (step 1210 of FIG. 12). Next, the program determines if a chain does not exist or if the program has examined all the information structures in the chain (step 1220). In the example, neither of these exit conditions is satisfied and the program continues processing by obtaining the pending return address into the function associated with the Current Information Structure Pointer (step 1230).

In the example, the Near Return Address Pointer O11 of FIG. 13 points to the memory location referenced by SP(260) 1080. By subtracting an Address Length Constant from this memory location, the preferred embodiment of the present invention indexes to location 1399: the location storing the pending return address into function 260. However, the contents of location 1399, conceptually illustrated by reference 1310, is in the loaded segment 120—not the selected segment 1320. Therefore, the program walks the chain of linked information structures to the previous Information Structure 910 of FIG. 13 (steps 1240 and 1290 of FIG. 12).

This time, however, the Update Chain-Unload Program determines that Information Structure 910 of FIG. 13 has a pending return address into the selected segment 1320 (step 1240). Subsequently, the Program converts the return address into a segment number and a relative offset (i.e., 0x2 and 0x8000, respectively) (step 1250 of FIG. 12). Additionally, the program stores the segment number and relative offset in the appropriate locations of Information Structure 910 (i.e., locations 1493 and 1494 of FIG. 14, respectively) (step 1270 of FIG. 12). The Update Chain-Unload Program then replaces the return address at location 1401 in FIG. 14 with a Pointer to Restoring Code 1420 (step 1280 of FIG. 12).

Similarly, the processing loop the Update Chain-Unload Program examines Information Structure 810 of FIG. 13 and discovers a second pending return address into the selected segment (step 1240 of FIG. 12). Thus, the program again translates the return address into a segment number (i.e., 0x02) and an offset (i.e., 0x4000) and stores the segment number and offset in their respective locations of Information Structure 810 (i.e., 1483 and 1484 of FIG. 14) (step 1270 of FIG. 12). Additionally, the Update Chain-Unload Program, replaces the associated pending return address 1402 of FIG. 14 with a Pointer to Restoring Code 1420 (step 1280 of FIG. 12).

Figure 14:
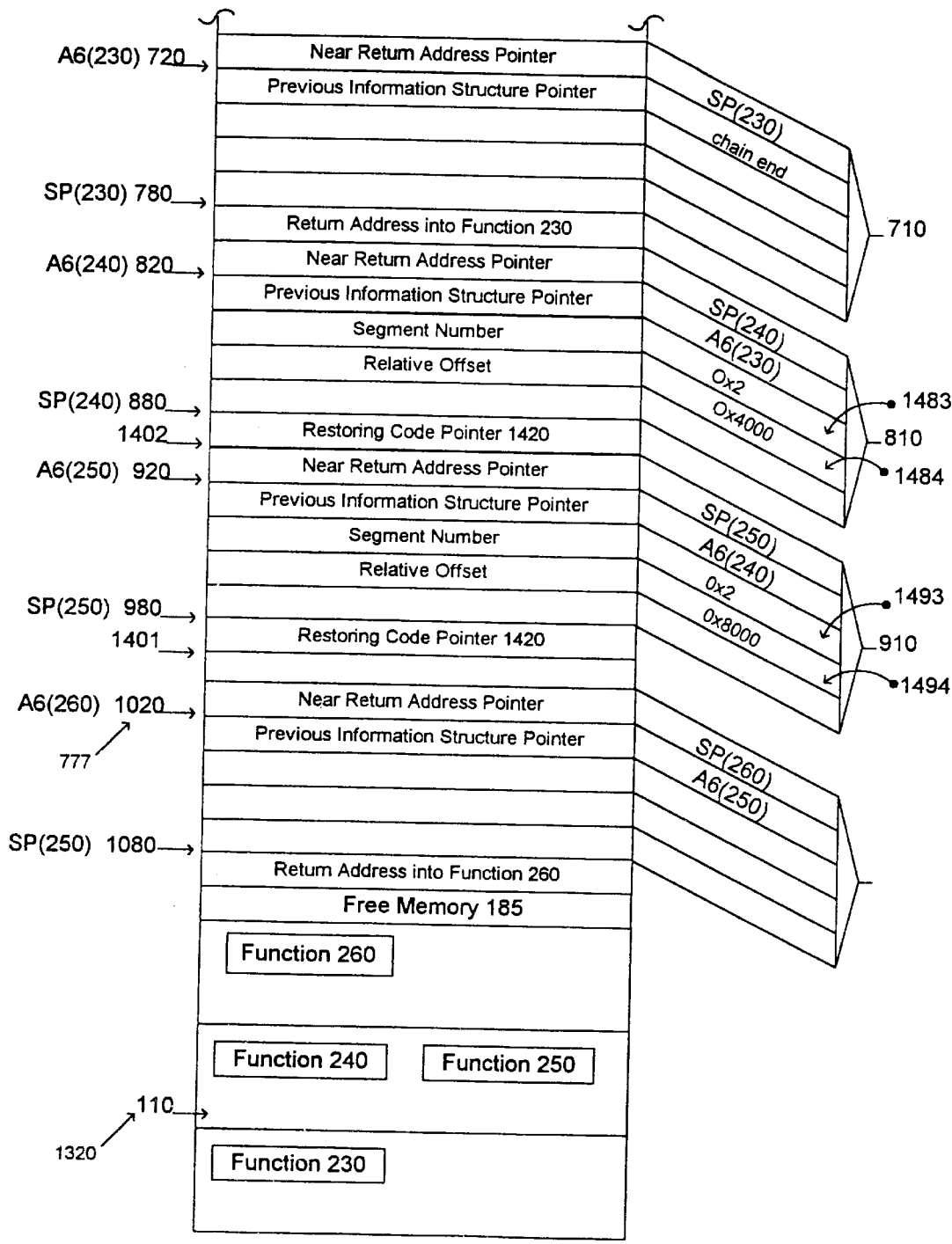
FIG. 14 is an illustrative example of the preferred embodiment of the present invention showing the state of the application space after the preferred embodiment has resolved pending return addresses for the functions of the selected segment into segment numbers and offsets.

Finally, the Update Chain-Unload Program examines the Information Structure 710 of FIG. 14 and determines that its pending return address is not in the selected segment 1320. This determination is analogous to that previously described for the Information Structure 1010 of FIG. 13. Having checked the entire information structure chain, the Update Chain-Unload Program returns control to the Swapper Unload Program which marks the selected segment 1320 of FIG. 14 as a purgeable block (step 1140 of FIG. 11). By marking the selected segment 1320 of FIG. 14 as a purgeable block, the amount of memory occupied by this segment is transformed into Free Memory 185 of FIG. 15. However, the data (i.e., code) contained within the purgeable block is not destroyed unless additional data (e.g., another segment) is swapped into the memory locations occupied by the purgeable block. Having marked the segment as purgeable, the Swapper Unload Program returns control to the Main Swapper Program. At this point, the Main Swapper Program of FIG. 4 loads segment 130 of FIG. 2 in the manner previously described (FIGS. 5 and 6).

Thus far, the example has illustrated the inventive loading and unloading techniques of the preferred embodiment of the present invention. At this point, the reloading process will be described. In order to keep this description as brief as possible, the following assumptions are made as outlined in FIG. 15. First, that available Free Memory 185 is sufficient to load the swapped-out segment referenced by the segment number 1493 of FIG. 15. Moreover, assume that the function 260 of FIG. 2 is the currently executing function and is preparing to return control to the OS trap 255. This return of control path is conceptually illustrated as the dotted path 299 in FIG. 2.

Prior to returning control to the OS trap 255, however, function 260 must deallocate its used stack space and update the linked list of information structures (steps 386 and 388 of FIG. 3B). Function 260 may accomplish these duties by using the epilogue subroutine provided in the swapper library. The epilogue subroutine deallocates the stack space using an UNLK A6 instruction. However, those skilled in the art will appreciate that the stack deallocation may be accomplished in a number of ways (e.g., by successively decrementing the stack pointer). The UNLK A6 instruction performs the converse of the previously described LINK A6, #nn instruction; that is, the UNLK A6 instruction releases Information Structure 1010 of FIG. 15 from the stack by setting the Stack Pointer 776 to the contents of the frame pointer (i.e., the memory location referenced by A6(260) 1020). However, because the prologue subroutine adjusted the frame pointer to point to Near Return Address Pointer 1011, the epilogue subroutine must readjust the frame pointer to its original location before executing the UNLK A6 instruction. For example, the entire epilogue subroutine code, written in 68000 Assembly, might look like:

```
addq.w  #4, a6                          ;readjustment of frame pointer
move.l  -8(a6), pointer_to_chain_head   ;adjust chain head pointer to
                                         point to previous information
                                         structure
unlk    a6                              ;unlink local data
rts                                     ;return instruction
```

Figure 15:
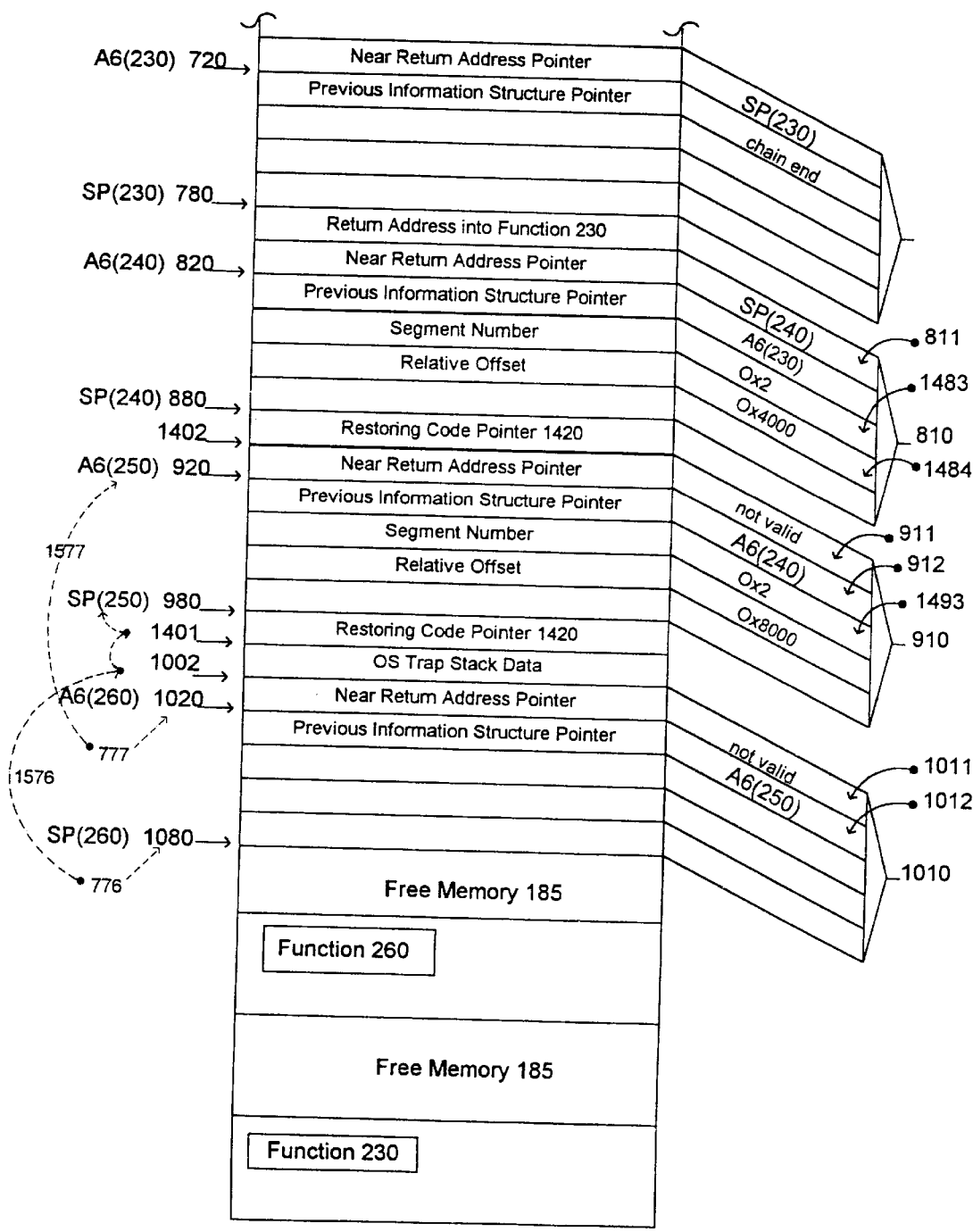
FIG. 15 is an illustrative example of the preferred embodiment of the present invention showing the state of the application space after the preferred embodiment has unloaded the selected segment and further illustrates the deallocation of data off the stack.

In the example, the above epilogue subroutine code updates the Chain Head Pointer 777 from location A6(260) 1020 to A6(250) 920 in FIG. 15. Thus, the Chain Head Pointer 777 points to Information Structure 910 as opposed to Information Structure 1010. The updating of the Chain Head Pointer 777 is conceptually illustrated by the dotted line 1577. Additionally, the above code, via the UNLK A6 instruction, updates the Stack Pointer 776 from location SP(260) 1080 to point to location 1002 in FIG. 15. The updating of the Stack Pointer 776 is conceptually illustrated by the dotted line 1576. As a result, when the epilogue subroutine executes the return instruction, the preferred embodiment returns processing control to the OS trap 255. Similarly, when the OS trap 255 returns to function 250, the OS trap releases its used stack space, pops the Restoring Code Pointer 1420 out of stack location 1401, and directs processing to the Restoring Code Program of FIG. 16.

Once the Restoring Code Program has processing control, it retrieves the segment number and offset from the information structure referenced by the Chain Head Pointer 777 in FIG. 15 (i.e., Information Structure 910) before jumping to the Main Swapper Program (steps 1610 and 1620 of FIG. 16). In turn, the Main Swapper Program of FIG. 4 reloads the segment using the Swapper Load Program of FIG. 5. More specifically, the preferred embodiment loads segment 110, the segment number referenced by block 1493 of FIG. 17, into Free Memory 185 in the manner previously described (steps 503 and 504 of FIG. 5). Subsequently, the Swapper Load Program transfers control to the Update Chain-Load Program (step 505).

As explained previously, the Update Chain-Load Program of FIG. 6 restores the unloaded relative return addresses of the segment that has just been reloaded into valid absolute return addresses. After initializing the Current information structure Pointer and checking for exit conditions, the program determines if the Current Information Structure Pointer references an information structure belonging to the currently executing function (steps 610, 620 and 624). In this case, the contents of the Near Return Address Pointer 911 of FIG. 15 identifies function 250 as the currently executing function. Consequently, the Program walks the chain of information structures and retrieves the address stored in the Near Return Address pointer 811 of FIG. 15 (i.e., SP(240) 880) (step 660 of FIG. 6). In turn, the program determines the location of the original return address by subtracting an Address Length Constant from the retrieved address (step 625 of FIG. 6). In the example, the preferred embodiment indexes to location 1402 in FIG. 15. The preferred embodiment then determines that (1) the contents of memory location 1402 of FIG. 15 is a Restoring Code Pointer 1420 and (2) the segment that the swapper just reloaded equals the segment referenced by the segment number 1483 stored in the Information Structure 810 (step 630). Consequently, the preferred embodiment of the present invention converts the segmented return address (1483 and 1484 of FIG. 15) into an absolute return address 1701 of FIG. 17 (step 640 of FIG. 6).

The Update Chain-Load Program converts the relative return address stored in Information Structure Pointer 810 of FIG. 15 into an absolute return address (step 640 of FIG. 6). The preferred embodiment accomplishes this conversion by adding the relative offset 0x4000 (1484 of FIG. 15) to the address where the Swapper Load Program reloaded the segment into Free Memory 185. By storing the Converted Absolute Return Address 1701 of FIG. 17 into the memory location referenced by block 1402 of FIG. 17, the preferred embodiment directs processing control to the correct location in function 240 when function 250 returns to function 240.

Figure 17:
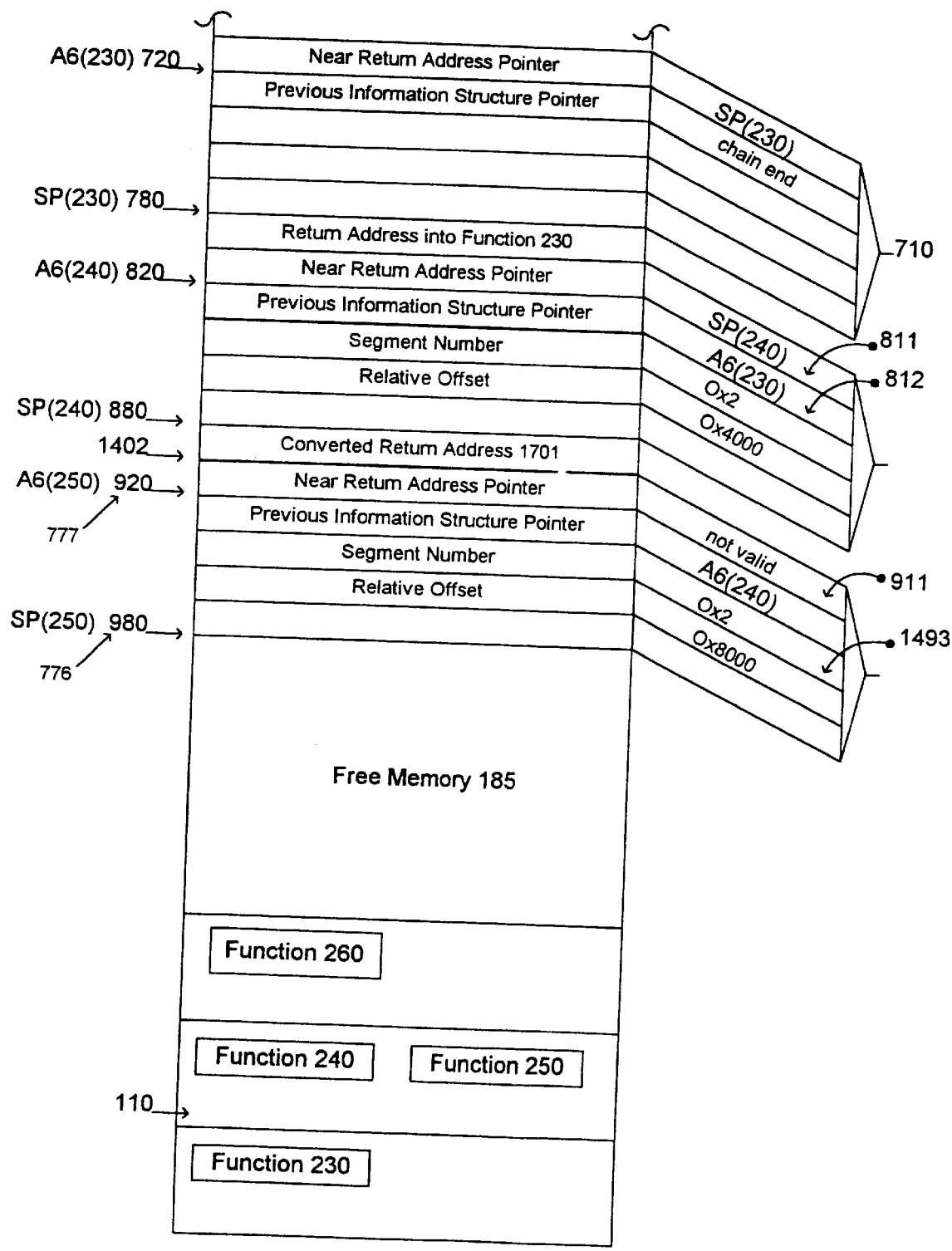
FIG. 17 is an illustrative example of the preferred embodiment of the present invention showing the state of the application space after the preferred embodiment has restored the associated segment numbers and offsets into valid absolute addresses.

Next, the Update Chain-Load Program sets the Current Information Structure Pointer to the information structure pointed to by the Previous Information Structure Pointer 812 of FIG. 17 (i.e., Information Structure 710) (step 660 of FIG. 6). On the next pass through the processing loop of the Update Chain-Load Program, the preferred embodiment of the present invention determines that Information Structure 710 of FIG. 17 does not have a pending return address into segment 110 (steps 620–660). At this point, the Update Chain-Load Program has examined all information structures in the chain and returns control to the Swapper Load Program of FIG. 5 (step 620 of FIG. 6). Having loaded the segment and updated the chain, the preferred embodiment continues executing the application code in the normal fashion (step 364 of FIG. 3B). Thus, the invention is able to load and unload application code segments from the current call chain 222 of FIG. 2.

The description provided herein will readily enable those skilled in the art to make various modifications to the above-described preferred embodiment. Accordingly, modifications may be made to the preferred embodiment without departing from the spirit and scope of the present invention. As such, the present invention is not limited by the details of the preferred embodiment but is instead only limited by the appended claims and their equivalents.

We claim:

1. In a computer system having a main memory, a secondary storage, and a central processing unit for executing instructions of modules, the modules including a calling module and a called module, the calling module having a call instruction that invokes the called module and causes the central processing unit to create a pending return address for the calling module, the pending return address being in an absolute format, a method for swapping modules in a current call chain, the method comprising the steps of:

provid ing, in the main memory of the computer system, a restoring code module;

providing, in the main memory area of the computer system, an information structure that stores data for the calling module;

translating the pending return address into a reference number and an offset, wherein the reference number identifies the calling module and wherein the offset serves as a relative index into the calling module;

storing the reference number and the offset in the information structure;

replacing the pending return address with an address of the restoring code module; and unloading the calling module from main memory.

2. The method of claim 1, further comprising the steps of:

storing a return address identifier in the information structure, the return address identifier serving to identify a memory location holding the pending return address; and retrieving the stored return address identifier to locate the pending return address.

3. The method of claim 1, further comprising the step of:

executing instructions of the restoring code module to (a) reload the module identified by the stored reference number, (b) resolve the reference number and the offset into an absolute address, the absolute address being a point of return into the reloaded module, and (c) direct the execution of instructions to the resolved absolute address.

4. The method of claim 2 wherein the computer system further includes a stack formed within the main memory and a stack pointer for pointing to memory locations of the stack and wherein the step of storing a return address identifier comprises the steps of:

determining a memory location pointed to by the stack pointer prior to the execution of the call instruction; and storing the determined memory location as the return address identifier.

5. In a computer system having an address space formed by a plurality of addresses and a central processing unit that executes instructions of modules in the address space using native representations of the addresses, a method for executing software in the address space, the method comprising the steps of:

loading a plurality of modules into a plurality of respective address ranges of the address space, the respective address ranges being mutually exclusive of each other;

selecting one of the loaded modules as a segment to be unloaded from memory;

providing an information structure for the selected module, wherein the information structure stores information for the selected module;

determining a memory location holding a native representation of a needed address, the needed address being in the address range of the selected module, and the needed address pointing to a crucial piece of information that a second module will need to access, and wherein the second module is relying on accessing the crucial piece of information using the native representation of the needed address;

translating the needed address into a non-native representation of the needed address; and storing the non-native representation of the needed address in the information structure provided for the selected module.

6. The method of claim 5, further comprising the steps of:

loading the memory location holding the needed address with an address of a restoring code module;

unloading the selected module from the address space; and executing the instructions of the restoring code module in order to allow the second module to access the crucial piece of information of the selected module.

7. The method of claim 5 further comprising the steps of:

identifying a second module from among the plurality of modules;

providing an information structure for the second module; and linking the information structure provided for the selected module with the information structure provided for the second module.

8. The method of claim 5 wherein the selected module is a calling function and the second module is a called function, and wherein the native representation of the needed address is a return address into the calling function, the method further comprising the step of:

storing an identifying memory location in the information structure provided for the selected module, wherein the identifying memory location serves to identify the memory location holding the first absolute address.

9. The method of claim 6 wherein the step of executing the instructions of the restoring module comprises the steps of:

reloading the selected module into a new address range in the address space; and resolving the non-native representation of the needed address into a second native representation of the needed address, the second native representation of the needed address being in the new address range, and the second native representation of the needed address pointing to the crucial piece of information that the second module needs to access.

10. The method of claim 6 wherein the step of translating the needed address into the non-native representation of the needed address comprises the steps of:

identifying a reference number for the selected module; and identifying a relative offset, wherein the relative offset serves as an index to a proper point of return into the selected module.

11. The method of claim 9 wherein the step of executing instructions of the restoring module comprises further comprises the step of:

loading the memory location holding the address of the restoring code module with the second native representation of the needed address.

12. The method of claim 10 wherein the step of executing instructions of the restoring module comprises the steps of:

retrieving the reference number and the relative offset from the information structure provided for the selected module;

reloading the selected module into a known address in the address space using the retrieved reference number as an identifier of the selected module;

adding the relative offset to the known address in order to create a second absolute address; and redirecting execution of instructions to the second absolute address.

13. A method for swapping a plurality of application segments in a computer system, wherein each application segment is composed of at least one function, each function being comprised of a plurality of instructions, and wherein the computer system comprises a main memory, a secondary storage and a central processing unit, wherein the central processing unit directs processing control by executing the instructions of the functions, the method comprising the steps of:

loading a plurality of segments into a plurality of respective address ranges of the main memory, the respective address ranges being mutually exclusive of each other;

executing the instructions of a plurality of calling functions of a loaded segment, wherein each calling function makes a call to a called function;

generating an information structure upon entry to each function, wherein each information structure includes fields for storing a segment number, an offset, a previous information structure indicator and a near return address indicator and wherein each information structure is stored at an exclusive address in the main memory of the computer system;

for a plurality of information structures, loading an address into each previous information structure indicator, the loaded address identifying the exclusive address of a previous information structure in a chain of information structures; and for each calling function, storing a return address identifier into the near return address indicator of the information structure generated upon entry to the calling function, the return address identifier identifying an address in main memory where the calling function made the call to the called function.

14. The method of claim 13, further comprising the steps of:

selecting a segment to be unloaded;

walking the chain of information structures to determine calling functions of the selected segment that have pending return addresses, each pending return address being stored in a return address memory location in main memory;

for each determined calling function of the selected segment, representing the pending return address as a segment number and an offset, wherein the segment number references the selected segment and the offset serves as a relative index into the selected segment, storing the segment number and the relative offset in the information structure generated upon entry to the calling function of the selected segment, and replacing the pending return address with an address of a restoring code module, the restoring code module being comprised of a plurality of instructions and wherein the step of replacing the pending return address with the address of the restoring code module comprises storing the address of the restoring code module in the return address memory location; and unloading the selected segment from the memory of the computer system.

15. The method according to claim 14 wherein the step of walking the chain of information structures to determine calling functions of the selected segment that have pending return addresses comprises the steps of:

identifying the address range of the selected segment; and for each of a plurality of the determined calling functions, obtaining a return address into the determined calling function and comparing the return address with the absolute address range of the selected segment, wherein the step of obtaining the return address into the determined calling function comprises (a) retrieving the return address identifier from the near return address indicator of the information structure generated for the determined calling function, (b) indexing a predetermined distance away from the return address identifier in main memory where the determined calling function made the call to the called function, thereby indexing to a pointer holding a return address, and (c) examining the contents of the pointer holding the return address.

16. The method of claim 14, further comprising the steps of:

executing the instructions of the restoring code module, wherein the restoring code, (a) reloads the segment referenced by the segment number of the information structure generated upon entry to the calling function of the selected segment, (b) resolves the segment number and the relative offset stored in the information structure generated upon entry to the calling function of the selected segment into an absolute address, the absolute address being the proper point of return into the reloaded segment, and (c) returns processing control to a memory location of the resolved absolute address.

17. The method of claim 14, further comprising the steps of:

executing the instructions of one of the called functions until a return instruction is executed;

directing processing control to the address of the restoring code module;

walking the chain of information structures to a most recently generated information structure;

retrieving the segment number from a most recently generated information structure;

reloading the segment referenced by the segment number into a known address of the memory of the computer system;

retrieving the relative offset from the most recently generated information structure; and resolving the segment number and the relative offset into the absolute address by adding the relative offset to the known address.

* * * * *

UNITED STATES PATENT AND TRADEMARK OFFICE
CERTIFICATE OF CORRECTION

PATENT NO. : 5,809,564
DATED : September 15, 1998
INVENTOR(S) : Craze et al.

It is certified that error appears in the above-indentified patent and that said Letters Patent is hereby corrected as shown below:

Column 6, line 25, delete "processes" and insert --process is--.

Column 11, line 29, delete "swapped out" and insert --swapped-out--.

Column 12, line 30, delete "he" and insert --the--.

Column 12, line 31, delete "lock" and insert --block--.

Column 14, line 13, delete "pointer-to-chain-head" and insert --pointer_to_chain_head--.

Column 14, line 15, delete "pointer-to-chain-head" and insert --pointer_to_chain_head--.

Column 14, line 18, delete "accomplish ed" and insert --accomplished--.

Column 14, line 24, delete "friction" and insert --function--.

Column 14, line 65, delete "swapping enabled" and insert --swapping-enabled--.

UNITED STATES PATENT AND TRADEMARK OFFICE
CERTIFICATE OF CORRECTION

PATENT NO. : 5,809,564
DATED : September 15, 1998
INVENTOR(S) : Craze et al.

It is certified that error appears in the above-indentified patent and that said Letters Patent is hereby corrected as shown below:

Column 15, line 7, delete "ptr" and insert --ptr.--.

Column 15, line 63, delete "LINKA6" and insert --LINK A6--.

Column 16, line 19, delete "function" and insert --function.--

Column 17, line 38, delete "10" and insert --110--.

Column 18, line 4, delete "011" and insert --1011--.

Signed and Sealed this

Twenty-sixth Day of January, 1999

Attest:

Attesting Officer

Acting Commissioner of Patents and Trademarks